United States Patent
Tennant et al.

(10) Patent No.: US 10,629,989 B2
(45) Date of Patent: Apr. 21, 2020

(54) PHASED ARRAY COMMUNICATION SYSTEM WITH REMOTE RF TRANSCEIVER AND ANTENNA BEAM CONTROL

(71) Applicant: Precision Optical Transceivers Inc., Rochester, NY (US)

(72) Inventors: Bryce Tennant, Rochester, NY (US); David M. Calhoun, Penfield, NY (US); Jeffrey A. Steidle, Geneseo, NY (US)

(73) Assignee: PRECISION OPTICAL TRANSCEIVERS INC., Rochester, NY (US)

( * ) Notice: Subject to any disclaimer, the term of this patent is extended or adjusted under 35 U.S.C. 154(b) by 0 days.

(21) Appl. No.: 16/165,089

(22) Filed: Oct. 19, 2018

(65) Prior Publication Data

US 2019/0267708 A1    Aug. 29, 2019

Related U.S. Application Data

(63) Continuation-in-part of application No. 16/042,641, filed on Jul. 23, 2018, now Pat. No. 10,505,632.

(Continued)

(51) Int. Cl.
*H04B 10/00* (2013.01)
*H01Q 3/26* (2006.01)
(Continued)

(52) U.S. Cl.
CPC ........... *H01Q 3/2676* (2013.01); *H01Q 3/005* (2013.01); *H04B 10/505* (2013.01)

(58) Field of Classification Search
CPC .............. H04B 10/505; H04B 10/2575; H04B 2210/006; H04B 10/50575;
(Continued)

(56) References Cited

U.S. PATENT DOCUMENTS 4,739,334 A    4/1988  Soref
4,885,589 A    12/1989 Edward et al.
(Continued)

OTHER PUBLICATIONS

Longbrake, M., "True Time-Delay Beamsteering for Radar," Wright State University, Air Force Research Laboratory Sensors Directorate, Dayton, OH, 2012 IEEE National Aerospaceand Electronics Conference (NAECON) (Jul. 2012).
(Continued)

*Primary Examiner* — Hibret A Woldekidan
(74) *Attorney, Agent, or Firm* — Fox Rothschild LLP; Robert J. Sacco

(57) ABSTRACT

Phased array antenna system operated from a remote location. Operations at a radio hub location involve generating an RF signal and modulating with the RF signal a continuous wave optical carrier to produce a transmit modulated optical carrier (TMOC). Electronic control signal digital data is also generated at the radio hub to control an antenna beam pattern of an array antenna. The control signal digital data is used to modulate an optical carrier for generating a control signal modulated optical carrier (CSMOC). Both the TMOC and CSMOC are coupled to an optical fiber for communication to an antenna site remote from the radio hub location. At the antenna site, the CSMOC and TMOC are processed to recover the electronic control signal digital data and a plurality of transmit element level modulated RF (ELMRF) signals which are applied to array antenna elements.

33 Claims, 14 Drawing Sheets

Related U.S. Application Data

(60) Provisional application No. 62/634,627, filed on Feb. 23, 2018.

(51) Int. Cl.
  *H04B 10/50* (2013.01)
  *H01Q 3/00* (2006.01)

(58) Field of Classification Search
  CPC .. H04B 10/50572; H04B 10/40; H04B 10/50;
      H04B 10/5161; H04B 10/671; H04B
      10/69; H04B 10/2504; H01Q 3/2676;
      H01Q 3/005; H01Q 21/22; H01Q 3/26;
      H01Q 21/0006; H01Q 21/065; H04J
      2203/0035; G02B 6/4249; H04Q 11/0067;
      H04Q 2011/0064; G01S 7/282; G02F
      2203/055; H04H 20/69; H04H 20/77;
      H04L 27/00; H04L 12/6418; H04L
      2012/5607; H04N 21/2385
  USPC ........ 398/188, 115, 116, 117, 140, 141, 142, 398/186, 135
  See application file for complete search history.

(56) References Cited

U.S. PATENT DOCUMENTS

| | | | |
|---|---|---|---|
| 5,117,239 A | 5/1992 | Riza | |
| 5,333,000 A | 7/1994 | Hietala et al. | |
| 5,751,242 A * | 5/1998 | Goutzoulis | G01S 7/032 342/157 |
| 5,867,295 A * | 2/1999 | Betts | H04B 10/5051 398/115 |
| 6,229,482 B1 | 5/2001 | Vaughan | |
| 6,836,515 B1 * | 12/2004 | Kay | H04B 1/406 375/260 |
| 7,446,696 B2 * | 11/2008 | Kondo | G01S 7/35 180/167 |
| 7,545,868 B2 | 6/2009 | Kennedy et al. | |
| 7,724,179 B2 * | 5/2010 | Williams | H04B 1/28 244/3.1 |
| 8,180,183 B1 * | 5/2012 | Yap | H01Q 13/00 343/772 |
| 9,070,972 B2 | 6/2015 | Wang et al. | |
| 9,467,228 B2 * | 10/2016 | Nakashima | H04B 10/2572 |
| 9,525,489 B2 | 12/2016 | Schuetz et al. | |
| 9,614,280 B2 | 4/2017 | Shi et al. | |
| 9,831,901 B2 * | 11/2017 | Kpodzo | H04B 1/1027 |
| 10,103,823 B1 * | 10/2018 | Kyrolainen | H04B 17/0087 |
| 10,312,999 B2 | 6/2019 | Neuman | |
| 10,484,093 B2 * | 11/2019 | Calhoun | H01Q 21/0006 |
| 10,505,632 B1 * | 12/2019 | Tennant | H04B 10/516 |
| 2003/0090777 A1 | 5/2003 | Yap | |
| 2004/0208636 A1 * | 10/2004 | Reynolds | H04B 10/25758 398/183 |
| 2006/0067709 A1 * | 3/2006 | Newberg | H01Q 3/2676 398/188 |
| 2007/0280704 A1 | 12/2007 | Fitzgerald et al. | |
| 2008/0225375 A1 * | 9/2008 | Newberg | G02B 6/122 359/279 |
| 2009/0067772 A1 | 3/2009 | Khurgin et al. | |
| 2009/0110398 A1 | 4/2009 | Pfeiffer | |
| 2009/0263144 A1 | 10/2009 | McKinney | |
| 2011/0038632 A1 | 2/2011 | Zou | |
| 2012/0070151 A1 | 3/2012 | Shin et al. | |
| 2012/0189308 A1 * | 7/2012 | Watanabe | H04B 10/07 398/79 |
| 2013/0202308 A1 | 8/2013 | Middleton et al. | |
| 2014/0126914 A1 | 5/2014 | Berlin et al. | |
| 2017/0207531 A1 | 7/2017 | Murakowski | |
| 2018/0091335 A1 | 3/2018 | Schnizler | |
| 2018/0102847 A1 | 4/2018 | Kim et al. | |
| 2019/0212472 A1 * | 7/2019 | Tennant | G02B 1/005 |
| 2019/0222320 A1 * | 7/2019 | Calhoun | H04Q 11/0062 |

OTHER PUBLICATIONS

Righini, G.C., et al., "Glass Optical Waveguides: A Review of Fabrication Techniques," Optical Engineering 53(7), 071819 (Jul. 2014).

Chang, Chia-Ming, et al., "High-power dual-fed traveling wave photodetector circuits in silicon photonics," Aug. 24, 2015, vol. 23, No. 17, DOI: 10.1364/OE.23.022857, Optics Express 22857.

Bang, A., et al., "InP-based waveguide photodiodes heterogeneously integrated on silicon-on-insulator for photonic microwave generation," Nov. 4, 2013, vol. 21, No. 22, DOI: 10.1364/OE.21.025901, Optics Express 25901.

* cited by examiner

PHASED ARRAY COMMUNICATION SYSTEM WITH REMOTE RF TRANSCEIVER AND ANTENNA BEAM CONTROL

RELATED APPLICATIONS

This patent document is a continuation-in-part of U.S. patent application Ser. No. 16/042,641 (the '641 Application) filed on Jul. 23, 2018, and claims the benefit of U.S. Provisional Patent Application No. 62/634,627 (the '627 Application) filed on Feb. 23, 2018. The disclosures of '641 and '627 applications are incorporated herein by reference in full.

BACKGROUND

Statement of the Technical Field

The technical field of this disclosure relates to phased array communication systems, and more particularly to methods and systems for phased array antennas which are remote from associated radio and antenna beam control equipment.

Description of the Related Art

As the demand for communication bandwidth continues to increase, many wireless providers are turning towards higher frequency carriers: microwave (3-30 GHz) or millimeter wave (30-300 GHz). However these higher frequency carriers suffer from greater free-space propagation loss. To mitigate these effects constructive interference between a plurality of antenna elements can be used to focus the electro-magnetic radiation in one direction and thus increase an amount of antenna gain achieved in a particular direction. Such systems are sometimes referred to as phased array antenna systems, or more simply as "phased arrays." In a phased array antenna system, beam direction can be controlled by selectively adjusting the phase of signals associated with each of the antenna elements comprising the array. However, beam control can be improved when both amplitude and phase is controlled with respect to signals that are communicated to each antenna element.

The design and implementation of phased array antenna systems is complex and involves many challenges. Components required to perform radio frequency (RF) beam steering must be co-located with phased array antennas due to signal integrity losses at microwave wave, 3-30 GHz) and millimeter-wave (mm-wave 30-300 GHz) RF. The electronic fabrication technology used to realize these devices dictates the device's performance, footprint, and form factor.

SUMMARY

A method for operating a phased array antenna system from a remote location involves operations at a radio hub location and at a remote antenna site. Operations at the radio hub location, involve generating an RF signal and then modulating with the RF signal a continuous wave optical carrier to produce a transmit modulated optical carrier (TMOC). Further, electronic control signal digital data is generated to selectively control an antenna beam pattern of an array antenna. The electronic control signal digital data is used to modulate an optical carrier so as to generate a control signal modulated optical carrier (CSMOC) comprising digital data. Both the TMOC and CSMOC are coupled to a first optical fiber, whereby the TMOC and CSMOC are communicated to an antenna site which is remote from the radio hub location on a same optical fiber. In some scenarios, the TMOC and CSMOC are concurrently coupled to the first optical fiber.

At the antenna site, the CSMOC is processed to recover the electronic control signal digital data, and the TMOC is processed to produce a plurality of transmit element level modulated RF (ELMRF) signals. The electronic control signal data is used at the antenna site to selectively independently control a phase of each of the transmit ELMRF signals. The plurality of transmit ELMRF signals are then coupled respectively to a plurality of antenna elements of the array antenna.

According to one aspect, the plurality of transmit ELMRF signals can be obtained by splitting the TMOC into a plurality of transmit element level modulated optical carrier (ELMOC) signals, and then demodulating the transmit ELMOC signals. In such a scenario the phase of each of the transmit ELMRF signals can be controlled by performing at least one operation on each of the transmit ELMOC signals in the optical domain. In other scenarios, the phase of each of the transmit ELMRF signals can be controlled by performing at least one operation on each of the transmit ELMRF signals in the RF domain.

The electronic control signal data which has been recovered at the antenna site can also be used to selectively independently control an amplitude of each of the transmit ELMRF signals. In such scenarios, the amplitude of each of the transmit ELMRF signals can be controlled by performing at least one operation in the optical domain to selectively independently modify each of the transmit ELMOC signals. Alternatively, the amplitude of each of the transmit ELMRF signals can be controlled by performing at least one operation in the RF domain to selectively independently modify each of the transmit ELMRF signals.

According to one aspect, the system emulates direct communication in accordance with a predetermined electronic interface standard (PEIS) between an antenna control unit (ACU) at the radio hub, which generates the electronic control signal data, and a beam control processor (BCP), which uses the electronic control signal data at the antenna site. This function is facilitated by using a first and second transport module, respectively disposed proximate to the radio hub location and the antenna site, to communicate the CSMOC through the first optical fiber. The first transport module emulates the presence of the BCP at the radio hub by masking the presence of the optical fiber link between the ACU and BCP. This creates the appearance that the BCP is communicating directly with the ACU in accordance with the PEIS. The second transport module similarly emulates the presence of the ACU at the antenna site by communicating with the BCP in accordance with the PEIS, while masking the presence of the optical fiber link.

The method also involves certain receive operations which are performed at the antenna site. These operations can involve coupling a plurality of receive element level modulated RF (ELMRF) signals respectively from the plurality of antenna elements comprising the array antenna, to a plurality of optical modulators, so as to respectively generate a plurality of receive element level modulated optical carrier (ELMOC) signals. The electronic control signal data can be used in such scenarios to control certain phase adjustment operations to facilitate receive beamforming operations with respect to the array antenna. The plurality of receive ELMOC signals can be combined after the phase adjustment operations have been performed so as to form a receive modulated optical carrier (RMOC) signal.

This RMOC is then coupled to a second optical fiber to communicate the RMOC from the antenna site to the radio hub location.

The method also involves generating status digital data concerning a status of at least one condition at the antenna site. An optical carrier is then modulated in response to the status digital data so as to generate a status signal modulated optical carrier (SSMOC). This SSMOC can be coupled to a second optical fiber to communicate the SSMOC from the antenna site to the radio hub location. The first optical fiber and the second optical fiber can be the same optical fiber or a different optical fiber. Consequently, the TMOC, RMOC, CSMOC and SSMOC can in some scenarios be communicated concurrently on the same optical fiber.

The solution also concerns a communication system. The system includes a central radio hub. The central radio hub is comprised of an antenna control unit and at least one radio hub photonic subsystem (RHPS). The RHPS includes one or more opto-electronic and electro-optic (O/E-E/O) conversion interface(s). The antenna control unit is configured to generate electronic control signal digital data. The electronic control signal digital data is configured to selectively control an antenna beam pattern of an array antenna.

The RHPS is configured to modulate an optical carrier signal responsive the electronic control signal digital data so as to form a control signal modulated optical carrier (CSMOC). It also utilizes a radio frequency (RF) signal to modulate a continuous wave optical carrier to produce a transmit modulated optical carrier (TMOC). The RHPS further includes an optical multiplexer which is configured to concurrently couple the TMOC and the CSMOC to a first optical fiber for communication to an antenna site which is remote from the central radio hub. Accordingly, with the foregoing arrangement the TMOC and CSMOC are communicated on a same optical fiber.

The communication system also includes an antenna site photonic subsystem (ASPS). The ASPS is located at an antenna site which is remote from the central radio hub and is communicatively coupled to the RHPS through the first optical fiber. The ASPS is configured to process the CSMOC to recover the electronic control signal digital data, and split the TMOC into a plurality of transmit element level modulated optical carrier (ELMOC) signals. The ASPS uses the transmit ELMOC signals to produce a plurality of transmit element level modulated RF (ELMRF) signals. It further uses the electronic control signal data to selectively independently control a phase of each of the transmit ELMRF signals. The array antenna is comprised of a plurality of antenna element. The plurality of antenna elements are configured to accept the phase-adjusted transmit ELMRF signals from the ASPS to form a transmit antenna beam.

In some scenarios, the ASPS can further include a plurality of optical waveguides. These optical waveguides are configured to distribute the plurality of transmit ELMOC signals to a plurality of conversion locations. Each conversion location can be associated with a respective demodulator for extracting the transmit ELMRF signal. Each of these conversion locations are advantageously situated proximate to a respective one of a plurality of antenna elements.

In the communication system described herein, the plurality of antenna elements are also configured generate a plurality of receive element level modulated RF (ELMRF) signals in a receiving operation. In this regard, the ASPS includes a plurality of optical modulators respectively coupled to the plurality of antenna elements which are configured to respectively generate a plurality of receive element level modulated optical carrier (ELMOC) signals responsive to the receive ELMRF signals. The ASPS is responsive to the electronic control signal data to perform phase adjustment operations to facilitate receive beam-forming operations with respect to the array antenna. The ASPS is configured to combine the plurality of receive ELMOC signals to form a receive modulated optical carrier (RMOC) signal. The ASPS includes an optical coupler which is configured to couple the RMOC to a second optical fiber. This second optical fiber is configured to facilitate communication of the RMOC to the RHPS.

In the communication system solution described herein the ASPS can be further configured to generate status digital data concerning a status of at least one condition at the antenna site. The ASPS is configured to modulates an optical carrier responsive to the status digital data to generate a status signal modulated optical carrier (SSMOC). This SSMOC is coupled by the ASPS to the second optical fiber to communicate the SSMOC from the antenna site to the RHPS. This second optical fiber can be a different optical fiber as compared to the first optical fiber, or they can be the same optical fiber.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
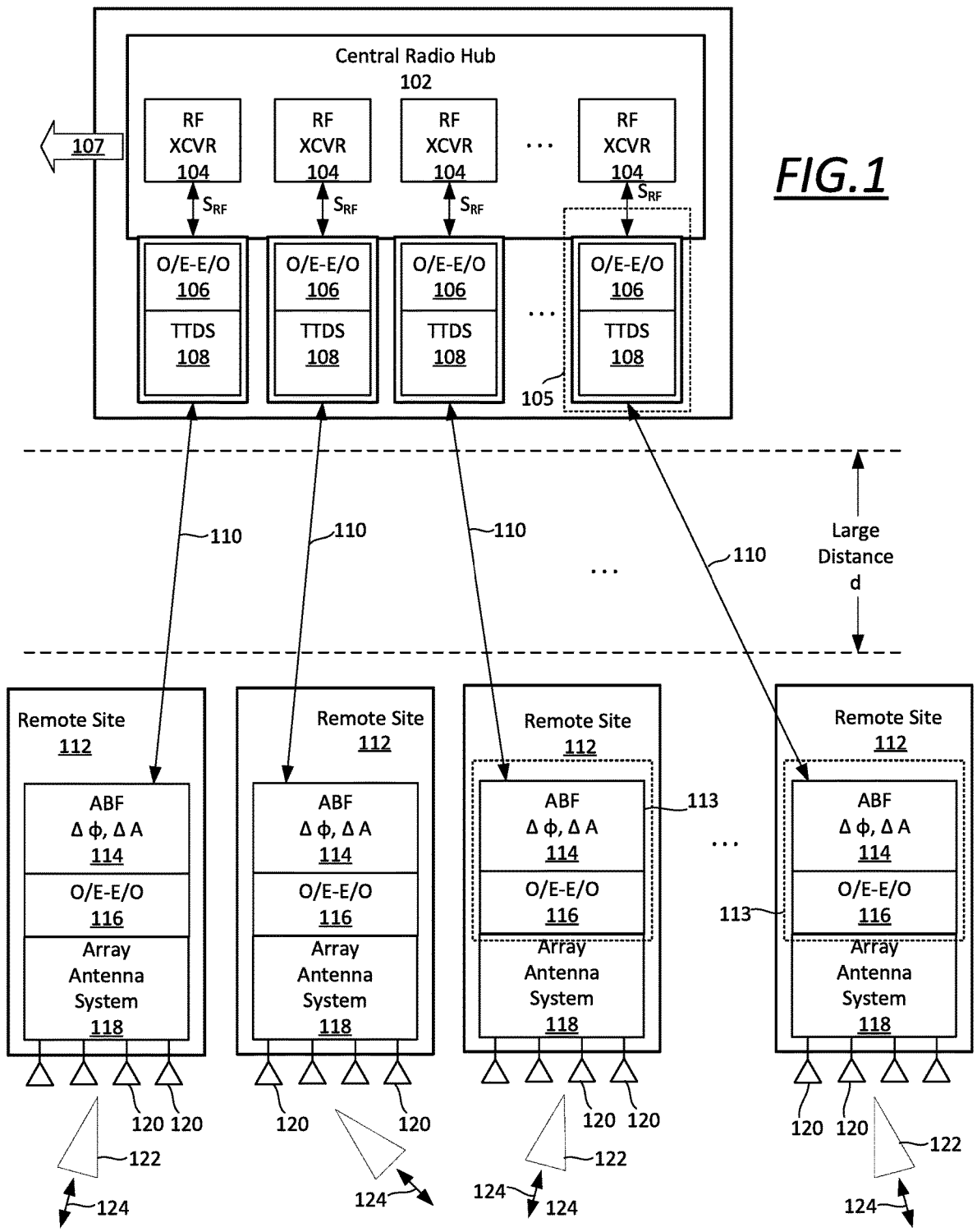
FIG. 1 is a block diagram that is useful for understanding a communication system architecture.

It will be readily understood that the components of the systems as generally described herein and illustrated in the appended figures could be arranged and designed in a wide variety of different configurations. Thus, the following more detailed description, as represented in the figures, is not intended to limit the scope of the present disclosure, but is merely representative of various scenarios. While the various aspects of the disclosure are presented in drawings, the drawings are not necessarily drawn to scale unless specifically indicated.

The solution concerns a system and method in which a remote phased array antenna in an RF communication system is fully implemented using an optical fiber communication link (in some cases consisting of only a single optical fiber) to concurrently communicate both analog RF signals (e.g., receive and/or transmit RF signals), and digital control data (e.g., beamforming and/or antenna operation status data) between the remote antenna and a radio hub location. More particularly, the optical fiber link is used to communicate an RF drive signal from radio equipment (e.g., a radio transmitter or transceiver) at a radio hub to the remote phased array antenna. Using the same optical fiber link, antenna beam control signal data for controlling the phased array can be communicated to the phased array antenna, from an antenna control unit (ACU) at the radio hub.

Further, RF signals received over the air at the phased array antenna, and antenna status information generated at the antenna site, can be communicated back to the radio equipment (e.g., a radio receiver or a transceiver) and control systems at the radio hub using the optical fiber link. In some scenarios, the same optical fiber can be used for all of the foregoing communications between the radio hub and the phased array antenna. Accordingly, the remote phased array antenna can be implemented using only a single optical fiber link for communicating both RF energy and control signals for the phased array between the radio hub and the antenna site. In other scenarios, a second optical fiber can be used to facilitate the operation of the system. For example, a first optical fiber can be used for communicating transmit RF energy and beam-steering control signals to the antenna site, and a second optical fiber can be used for communicating receive RF energy and antenna site status information to the radio hub.

In the solution presented herein, RF waveforms (e.g. microwave or millimeter wave) are modulated onto continuous-wave (CW) optical carriers to facilitate implementation of RF over fiber (RFoF) links. In a scenario described herein, a relatively large distance d, can separate the radio hub from the remote phased array antenna location(s). In some scenarios, radio equipment and one or more ACUs for a plurality of different remote phased array antennas can be collocated at the same radio hub and a plurality of the RFoF links can be provided to facilitate the operation of each phased array antenna.

In the solution presented, integrated photonics are provided at the location of the centralized radio hub to provide optical modulation and detection. In some scenarios, these integrated photonics can also facilitate true time delay (TTD) control. The terms group delay and time delay are sometimes used interchangeably in the literature, with true time delay being a derivative. Still, it will be appreciated that the disclosed embodiments are not strictly limited to a TTD control scenario and other group/time delay mechanisms are possible, whether now known or known in the future.

The components that facilitate the TTD control can interact with baseband, IF, or RF signals which have been modulated on a continuous-wave optical carrier such that beam squint mitigation is carried out in the optical domain. Additional integrated photonics which are used to facilitate beam forming for each RF transceiver are provided at a separate location, co-located with the remote phased array antenna. These integrated photonic components can interact with baseband, IF, or RF signals which have been modulated on a continuous-wave optical carrier such that beam steering and/or beam forming is carried out in the optical domain. Accordingly, TTD control and phase control are performed in physically separate locations, achieving decentralization and removing co-dependence (including thermal effects).

There are several advantages to the approach described herein. For example, removing the dependence of beam squint mitigation components from the primary beam controlling components offers reduced frequency dependence of formed/steered beams. Also, performing both TTD and phase control in the optical domain offers RF carrier transparency, i.e., the same circuit can effectively be used to control antenna beams across a wide range of frequencies (e.g., from less than 6 GHz to 100 GHz). A further advantage of this approach is that the use of integrated photonics allows for additional optical functionalities not available in electronics, such as wavelength-division-multiplexing.

System Overview

A block diagram showing one example of a system as described herein is provided in FIG. 1. The system is comprised of a central radio hub 102 which includes certain radio equipment. In the example shown, the radio equipment includes one or more RF transceivers 104 to facilitate bidirectional communications. However, it should be understood that in some scenarios the radio equipment can instead be comprised of a radio transmitter and/or a radio receiver.

Each RF transceiver 104 can facilitate radio communications with one or more communication devices (not shown) by using a corresponding array antenna system 118. In some scenarios, the communication devices can be mobile subscriber units (e.g. mobile subscriber units associated with a cellular radio communication network), in which case a network backhaul communication link 107 can be provided. In FIG. 1 a plurality of RF transceivers are shown, but it should be understood that the system may comprise a single transceiver system and a single array antenna. Also, a single transceiver can in some scenarios be configured to concurrently operate on a plurality of different frequencies. Accordingly, in some scenarios, the plurality of $S_{RF}$ output signals which are communicated to the plurality of RHPS 105 can be generated concurrently by a single transceiver system. Further, it should be understood that each $S_{RF}$ associated with a particular RF transceiver can be a composite signal occupying a plurality of radio channels. As such, each $S_{RF}$ can be a broadband signal which occupies a relatively wide bandwidth (e.g. 3 GHz).

In the system shown in FIG. 1, RF signals are communicated between the RF transceiver and its corresponding array antenna system 118 using an RFoF link. This technique is facilitated by means of an optical fiber link 110 which extends from the central radio hub to each of the one or more remote sites 112. Each of the optical fiber link(s) 110 is supported at the radio hub by a radio hub photonic subsystems (RHPS) 105. Each RHPS 105 includes a optoelectronic (O/E) and electro-optic (E/O) conversion interface (collectively referred to herein as an O/E-E/O conversion interface) 106. In a scenario disclosed herein, the RHPS 105 can also include a TTD system (TTDS) 108 as shown.

Each array antenna system 118 is comprised of a plurality of antenna elements 120 and an associated antenna feed system (not shown in FIG. 1) which are located at a remote site 112. The antenna elements 120 can be any type of antenna element that is suitable for microwave and/or millimeter wave RF. In some scenarios, the antenna elements are comprised of microstrip devices disposed on an RF substrate. As such, the antenna elements can be planar and formed of a highly conductive material. Many different types of microwave and/or millimeter wave antenna elements are known in the art and all such element types (whether now known, or known in the future) are contemplated for use herein.

The remote site 112 can be disposed a relatively large distance from the central radio hub 102. In some scenarios, this distance d will be one that is supported for practical use with microwave and/or millimeter wave RF signals only as a result using an RFoF link as described herein. For example, in some scenarios the separation distance d between the centralized radio hub 102 and the remote site 112 can be on the order of 0.1 to 10.0 kilometers or more. Other distances are possible, and the solution is therefore not limited to the range of distances stated herein. Still, it should be understood that many of the benefits of a system architecture as described herein are most notably realized when distance d is relatively large.

Also provided at the remote site 112 is an antenna site photonic subsystem (ASPS) 113. The ASPS 113 includes an O/E-E/O conversion interface module 116. In some scenarios, the ASPS 113 can also include an antenna beam former (ABF) 114. The ABF and O/E-E/O can function cooperatively with the array antenna system 118 to control a boresight direction 124 in which an RF antenna beam 122 is pointed. As described below in further detail, the beamforming can be accomplished by causing certain modifications to a phase and gain of a plurality of signals associated with a plurality of array antenna elements. In some scenarios, these phase and gain adjustments can be effectuated in the optical domain. In other scenarios, these phase and gain adjustments can be effectuated in the RF domain. If the phase and gain adjustments are effectuated in the RF domain, then it can be advantageous for the ABF to be separate from the ASPS 113. The ABF can be configured to perform passive beam steering but in some scenarios the ABF can be configured to facilitate dynamic beam steering operation.

In some scenarios, the RF signals communicated to a plurality of different remote sites 112 can have approximately the same bandwidth and can occupy the same frequency range. However, in other scenarios, each RF transceiver can be configured for a different frequency range so that the RF communications at each remote site avoid interference from neighboring sites. It will be appreciated that in such a scenario, each different TTDS 108 may need to apply a TTD adjustment which is structured specifically to compensate for the particular range of RF frequencies in use by a corresponding RF transceiver 104. The operation of the system shown in FIG. 1 will now be described in greater detail with reference to FIGS. 2 and 3.

Radio Hub Overview

Figure 2:
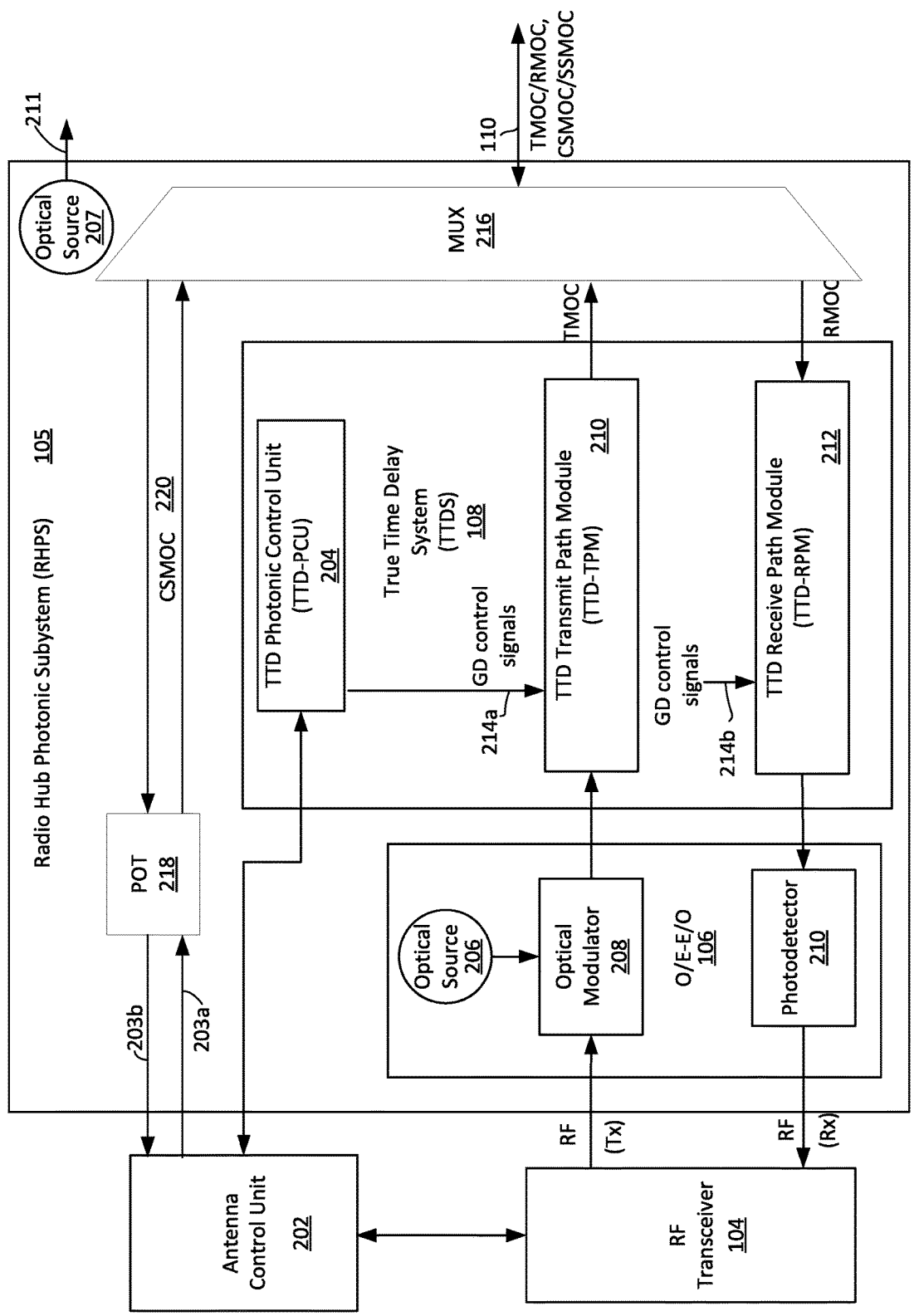
FIG. 2 is a block diagram that is useful for understanding a radio hub photonic subsystem (RHPS).

As shown in FIG. 2, the O/E-E/O conversion interface 106 can include an optical modulator 208, an optical source 206 (e.g., a laser source), and a photodetector 210. The RF transceiver 104 can be a conventional RF transceiver unit that is capable of transmit and receive operations within a predetermined frequency range. Depending on the particular communication application, a transmitter or receiver can sometimes be used in place of the transceiver. In some scenarios the RF transceiver can be configured for communicating digital data or symbols using RF signals in accordance with a conventional RF modulation scheme. For example, the RF signals transmitted and/or received by the RF transceiver can involve the use of amplitude shift keying (ASK), frequency shift keying (FSK), and/or phase shift keying (PSK), without limitation.

The optical modulator 208 can be an electro-optical (E/O) conversion device which modulates an analog RF transmit signal from the transceiver 104 onto a continuous wave optical carrier provided by the optical source 206. Optical modulators are well-known and therefore will not be described here in detail. However, it will be appreciated that the optical modulator 208 which is used for this purpose is advantageously selected to comprise a linear modulator so that the characteristics of the analog RF transmit signal are accurately applied to the optical carrier. For example, the linear modulator can impress the frequency, waveform and modulation features of the RF transmit signal upon the optical carrier. In this regard it should be noted that the analog RF transmit signal can itself be a modulated signal (e.g., an RF signal which has been modulated in accordance with a conventional RF modulation scheme such as ASK, FSK and/or PSK).

The modulated optical carrier signal produced as a result of the optical modulation process described herein will include both the original optical carrier and an optical sideband signal produced as a result of the optical modulation process. As is known, the optical sideband signal will be offset in frequency as compared to the original optical carrier. The combination of the continuous wave optical carrier and the sideband signal are sometimes collectively referred to herein as a transmit modulated optical carrier signal or TMOC. The TMOC signal from the optical modulator 208 can be provided to the TTDS 108. Within the TTDS 108, this signal is communicated to the TTD transmit path module (TTD-TPM) 210.

The photodetector 210 is a linear opto-electrical (O/E) conversion device. The photodetector 210 demodulates a receive modulated optical carrier (RMOC) signal that originates from an array antenna remote site 112. The RMOC can be similar to the TMOC insofar as it is comprised of an optical carrier which has been modulated by an RF signal (e.g., a modulated RF signal). Photodetectors capable of performing this type of demodulation operation are well known in the art and therefore will not be described here in detail. However, it will be appreciated that the photodetector 210 used for this purpose is advantageously selected to comprise a linear photodetector. As such, the photodetector 210 is configured to linearly demodulate the RMOC so as to accurately recover the analog RF receive signal which has been modulated on the optical carrier. For example, the photodetector can recover the frequency, waveform and modulation features of an RF receive signal which was previously used to modulate the RMOC. The RMOC is communicated to the photodetector 210 from a TTD receive path module (TTD-RPM) 212 which is included in the TTDS 108.

In some scenarios, an optical multiplexer 216 can be used to facilitate concurrent communication of both the TMOC and the RMOC on a shared optical fiber link 110. Notably, the shared optical fiber link 110 can in some scenarios be comprised of a single optical fiber. For example, in some scenarios wavelength division multiplexing (WDM) can be used to facilitate this feature. However, embodiments are not limited in this regard and other techniques can also be used.

At least one antenna control unit (ACU) can be provided at the central radio hub to facilitate control of beamforming operations performed at the array antenna system 118. The ACU generates beamforming control signals suitable to indicate the necessary phase and gain adjustments which are to be applied to signals at the antenna array so as to form a desired antenna beam. A such, the ACU can comprise a microprocessor, a central processing unit (CPU), an application specific circuit, a programmable logic device, a digital signal processor, or other processing circuit. The ACU can be realized in one computer system or several interconnected computer systems.

As shown in FIG. 2, the digital beamforming control signals 203*a* are communicated to a protocol optical transceiver (POT) 218. The POT 218 is described below in greater detail. However, it should be understood that the POT 218 will include a suitable opto-electronic and/or electro-optic interface (O/E-E/O). Here, the digital beamforming control signals are used to modulate an optical carrier to produce a control signal modulated optical carrier (CSMOC) 220 comprising digital data. In some scenarios, the CSMOC 220 can be coupled to optical multiplexer 216, where WDM can be used facilitate concurrent communication of both the TMOC and CSMOC on the same optical fiber. The multiplexed arrangement shown in FIG. 2 can be convenient as it facilitates communication of all payload and control signals on a common optical fiber link comprising a single optical fiber.

Antenna Site Overview

Figure 3:
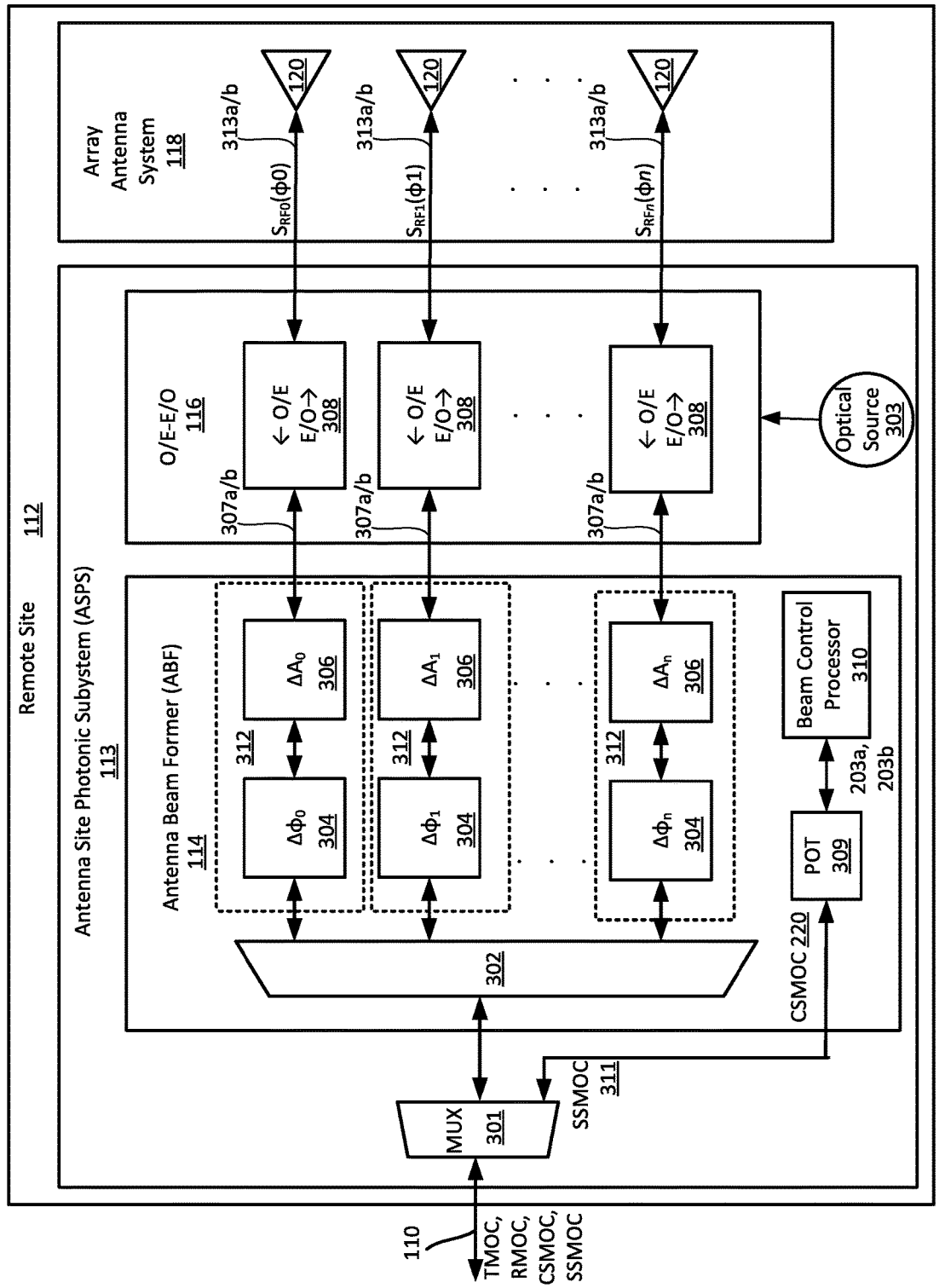
FIG. 3 is a block diagram that is useful for understanding an architecture of an antenna site photonic subsystem (ASPS).

A simplified block diagram is presented in FIG. 3 to facilitate an understanding of one example of the ASPS 113 and the associated array antenna system 118. At the remote site 112 an optical multiplexer 301 can be used to facilitate concurrent communication of both the TMOC, RMOC and/or CSMOC on optical fiber link 110. As noted above, wavelength division multiplexing (WDM) can be used to facilitate this feature. If the CSMOC beamforming control signals are communicated over optical fiber link 110 then optical multiplexer 301 can be used to separate the CSMOC 220 from the TMOC/RMOC signals. In some scenarios the multiplexer 301 can also facilitate multiplexing operations with respect to the TMOC/RMOC. However, this multiplexing operation is not explicitly shown in FIG. 3 so as to simplify and avoid unnecessary complexity in the drawing. As shown in FIG. 3, the CSMOC 220 can be communicated to protocol optical transceiver 309. The POT 309 includes an O/E-E/O conversion interface and will be discussed below in greater detail. The POT 309 will convert the CSMOC back to electronic digital data, before providing same to the beam control processor (BCP) 310.

As is known, antenna array beamforming operations in a transmit scenario can involve causing a variation in at least one of a phase and an amplitude of signals communicated to and/or from a plurality of antenna elements comprising an antenna array. Likewise, beamforming operations in the receive direction can involve carefully controlled phase and amplitude adjustments to RF signals which are received at a plurality of antenna elements comprising an array.

Coordination of the phase and gain adjustments applied to the signals associated with each antenna element 120 can be implemented by a suitable control system. In some scenarios, the antenna control unit 202 can function cooperatively with a separate computing system remote from the antenna control unit 202 and/or a further control component included in the TTDS 108 and/or the ASPS 113. For example, these separate computing systems can comprise a TTD photonic control unit (TTD-PCU) 204 and/or BCP 310. The BCP 310 can comprise a microprocessor, controller, application specific circuit, programmable logic device, digital signal processor, or other circuit programmed to facilitate the beam forming control functions. A control device as described herein may be a digital controller, an analog controller or circuit, an integrated circuit (IC), a microcontroller, formed from discrete components, or the like.

In the transmit direction, the processing performed at the remote antenna site 112 can involve splitting the TMOC into n channels. Thereafter, direct or indirect control of the phase and amplitude is applied respectively to the RF signals $S_{RF0}(\varphi0), S_{RF1}(\varphi1), \ldots S_{RFn}(\varphi n)$ which are communicated to antenna elements 120 forming a phased array. Each of these signals $S_{RF0}(\varphi0), S_{RF1}(\varphi1), \ldots S_{RFn}(\varphi n)$ is sometimes referred to herein as a transmit element-level modulated RF (ELMRF) signal 313*a*. In the receive direction, the processing performed at the remote antenna site will involve receiving n receive ELMRF signals 313*b* respectively from the n antenna elements 120, applying direct or indirect control of phase and amplitude adjustments which are applied respectively to the RF signals, and combining the n receive ELMRF signals to form a RMOC.

In both the transmit and receive direction the phase and amplitude control which is applied to each of the n channels can be individually specified by the BCP 310 in response to control signals received from antenna control unit 202. More particularly, the phase and gain adjustments applied to signals associated with each antenna element 120 can be controlled independently of the other channels so that each channel may have a slightly different phase and/or gain adjustment In a scenario which is shown in FIG. 3, the phase and gain adjustments which are applied to the transmit and receive ELMRF signals 313*a*, 313*b* are performed exclusively in the optical domain. Accordingly, ABF 114 includes an optical splitter/combiner element 302 to split or demultiplex a TMOC into n independent transmit element-level modulated optical carrier (ELMOC) signals 307*a*. Each transmit ELMOC signal is provided to one of the ELMOC channels 312 as shown. Each of the ELMOC channels 312 respectively includes a phase control element 304 and a gain control element 306 to facilitate indirect phase and gain control of the transmit ELMRF signal applied to each antenna 120. In FIG. 3, these phase and gain adjustments $\Delta\varphi_0, \Delta\varphi_1 \ldots \Delta\varphi_n$, and $\Delta A_0, \Delta A_1 \ldots \Delta A_n$, are performed in the optical domain. Thereafter, an O/E-E/O conversion interface 308, is used to convert the optical signals in each channel to the electronic domain whereby an transmit ELMRF signal 313*a* can be respectively applied to each antenna element 120.

Similarly, in the receive direction, n receive ELMRF signals 313*b* from antenna elements 120 are converted to receive ELMOC signals 307*b* at O/E-E/O conversion interfaces 308. A laser optical source 303 can be provided in the ASPS 113 to facilitate this conversion process. In other scenarios optical laser energy from an optical source 207 could be communicated to the ASPS from the RHPS 105 by means of optical fiber 211.

In some scenarios, the BCP 310 can be configured to monitor one or more conditions associated with the ASPS 113 and the array antenna system 118. These conditions can include operational status, performance, and so on. Based on such monitoring, the BCP 310 can generate status data 203*b* concerning a status of at least one condition at the antenna site. Further, the BCP 310 can use the status data 203*b* as a basis for modulating an optical carrier to generate a status signal modulated optical carrier (SSMOC) 311. The SSMOC can be communicated to the ACU 202 using the optical fiber link 110.

Phase and Gain Control in the Optical Domain

The receive ELMOC signals 307b which are produced at O/E-E/O conversion interfaces 308 are each respectively communicated to one of the ELMOC channels 312. Here, phase and gain adjustments are independently applied in the optical domain to each of n receive ELMRF signals from antennas 120. These phase and gain adjustments are implemented in the optical domain. Accordingly, the phase and gain adjustments are in a sense being indirectly applied to the receive ELMRF signals. After all phase and gain adjustments are applied, the respective ELMOC signals 307b from each of the channels 312 can be combined at splitter/combiner 302 to generate the RMOC. The RMOC can then be communicated to the MUX 301 for transmission back to the radio hub using optical fiber link 110. In some scenarios, the same optical fiber that is used to communicate the TMOC and CSMOC to the ASPS can also be used to communicate the RMOC to the antenna hub. In such a scenario, only a single optical fiber can be used to effectuate the optical fiber link 110. In other scenarios, at least a second optical fiber can be included as part of the optical fiber link 110 so as to facilitate communication of the RMOC to the radio hub.

The architecture which is conceptually shown in FIG. 3 represents one approach for applying phase and gain adjustments independently to a plurality of transmit and receive ELMRF signals in a phased array scenario. However, for purposes of the present disclosure, the particular architecture which is applied for asserting these phase and gain adjustments is not critical. Various other architectures are possible and can also be used to facilitate the split TTD and antenna control arrangement disclosed herein.

Phase and Gain Control in the RF Domain

Figure 4:
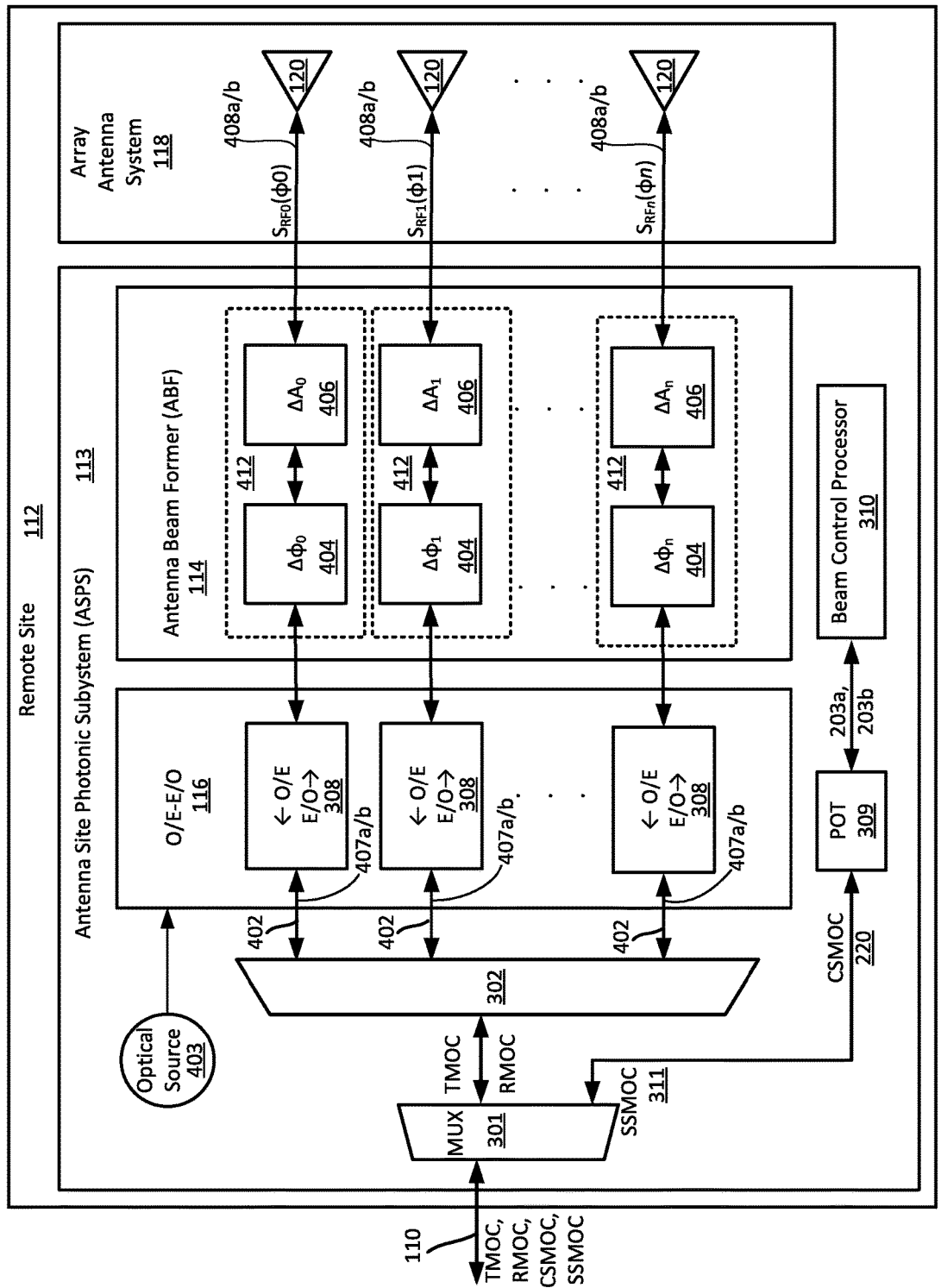
FIG. 4 is a block diagram that is useful for understanding an alternative architecture of an ASPS.

For example, FIG. 4 shows an alternative scenario in which phase and/or gain adjustments are applied to the transmit and receive ELMRF signals exclusively in the electrical domain. In FIG. 4, like elements to those in FIGS. 1-3 are represented using the same reference numbers. An optical splitter/combiner element 302 is configured to split a TMOC into n independent transmit ELMOC signals 407a. Each of these n signals are respectively communicated to one of n O/E-E/O conversion interfaces 308, which are used to convert the transmit ELMOC signals to ELMRF signals 408a. In this scenario an ABF 114 includes a plurality of ELMRF channels 412. Each of the ELMRF channels 412 respectively includes a phase control element 404 and a gain control element 406 to facilitate direct phase and gain control of the transmit ELMRF signal applied to each antenna 120. These phase and gain adjustments are performed in the electrical domain, between each optical conversion interface 308 and the antenna elements 120 comprising the array antenna system. Similarly, in the receive direction, phase and gain adjustments are applied in the electrical domain to n receive ELMRF signals 408b from antennas 120. After phase and gain adjustments are applied, each of the receive ELMRF signals from the channels 412 can be converted to a receive ELMOC signal 407b before being combined at splitter/combiner 302 to generate the RMOC. A laser optical source 403 can be provided in the ASPS 113 as shown to facilitate the generating of the receive ELMOC signals 407b. In other scenarios optical laser energy from a laser source 207 could be communicated for this purpose to the ASPS 113 from the RHPS 105 by means of optical fiber 211. The RMOC can then be communicated to the MUX 301 for transmission back to the radio hub using optical fiber 110.

In an array antenna, a plurality of array elements 120 can be distributed in a predetermined arrangement on a dielectric substrate to facilitate the array. In some scenarios, each O/E-E/O conversion interface 308 shown in FIGS. 3 and 4 can be located in close proximity to a corresponding one of these antenna elements 120. Further, optical waveguides (or optical fibers) 402 can be used to distribute the plurality of ELOC signals from splitter/combiner 302 to a plurality of conversion locations associated with the O/E-E/O conversion interfaces 308. The advantages of an optical distribution network diminish with increasing distance between each antenna element an its corresponding O/E-E/O. Accordingly, it can be advantageous for such distance to be maintained at less than 10 wavelengths at the operating frequency of the array antenna system.

In another scenario (not shown), an arrangement could be implemented in a manner similar to that shown in FIG. 4, but the splitting/combining operations could be performed in the electronic domain. In such scenarios, a single electro-optical conversion 308 interface could be used for the combined signal in the receive and/or transmit direction.

In another scenario, a plurality of RF signals associated with each of the antenna elements 120 could be individually communicated each as separate RFoF signals using the same optical fiber 110. Wavelength division multiplexing (WDM) could be used to combine these signals on the same optical fiber at the radio hub (for transport), and then separate these combined optical signals of different wavelength at the remote antenna site 112.

Alternative Configurations

From the foregoing it will be understood that there are a number of different architectures that could be applied for facilitating the antenna beam forming operations described herein. All such architectures, whether now known or known in the future are contemplated for use with the systems and methods described herein.

Further, it should be appreciated that one or more functions associated with array antenna system 118 could in some scenarios be integrated with the ASPS 113. Such an arrangement can have the potential of improving performance by reducing RF losses and facilitating more accurate control over phase/gain adjustments. According to one aspect, such an integrated approach could involve a photonics-fed beam steering arrangement whereby photonics are integrated with the array antenna system. In such a scenario, a plurality of element level optical waveguides could be used at the remote antenna to individually feed ELMOC signals directly to a plurality of conversion locations, each of which is proximate to a corresponding antenna element 120 of a phased array. Such an architecture could be implemented as a hybrid system involving a plurality of photonic integrated circuits (PICs), with optical waveguides used to distribute ELMOC signals directly to O/E-E/O conversion locations. These conversion locations can be proximate to antenna elements.

The close proximity of the O/E and E/O conversion devices to the antenna element in such scenarios is advantageous as it minimizes any degradation of RF signals communicated between the ABF 114 and each of the antenna element 120. As used herein, close proximity can refer in some scenarios to an electrical distance which is less than one wavelength at the RF operating frequency for which the antenna element is designed. As will be appreciated by those skilled in the art, the exact physical distance corresponding to such electrical distance can depend on the physical characteristics (e.g., permittivity) of the substrate material through which the RF signal is transmitted.

TTD Control at the Radio Hub

In the beam control systems described herein with respect to FIG. 3 the individual phase control elements 304 and amplitude control elements 306 can be sensitive to the wavelength $\lambda_0$ of the optical signal associated with the TMOC and RMOC signals. In a scenario where a wideband microwave signal is modulated on an optical carrier, the optical signal will comprise an optical carrier signal plus an optical sideband signal produced as a result of the modulation process. The optical sideband signal can be of relatively large predetermined bandwidth, e.g. 3 GHz. Consequently, a phase adjustment response can vary in phase control elements 304 over the range of optical wavelengths associated with the predetermined bandwidth. A similar condition can exist with respect to the amplitude control elements 306. These different phase and amplitude responses across the wavelength range of the predetermined bandwidth will produce the phenomena known as beam squint.

To alleviate and/or minimize the occurrence of such beam squint a true time delay (TTD) adjustment can be applied to a TMOC and/or RMOC over the wavelength range associated with the predetermined bandwidth. This time delay adjustment will have a response function which is basically an inverse of the wavelength variable response function associated with the phase control elements 304 and/or the amplitude control elements 306. Accordingly, the TTD adjustment is intended to compensate for the wavelength variable response in these control elements.

The TTD adjustment described herein can be applied in the TTD-TPM 210 and TTD-RPM 212. As will be understood from FIG. 1, the antenna phase/amplitude adjustments for beam-forming operations can in some scenarios be performed at a remote antenna site 112, whereas the timing adjustments which are applied to compensate for TTD can be performed at the location of central radio hub 102. One advantage of such approach is that it reduces latency associated with the TTD adjustments. A further advantage is that it can reduce the necessary bandwidth required for control signals communicated to a remote antenna site 112. Such control operations, when performed in physically separate locations, can have other advantages as well. For example, this approach can reduce problems of co-dependence (including thermal effects). These and other features of the disclosed embodiment are described in greater detail below.

The key advantage of using both TTD and phase/amplitude adjustments is provided regardless of co-location or separation. It is known that common phase control devices—whether photonic or electronic—typically provide phase adjustments with step-sizes on the order of single degrees (integer multiples of $N*\pi/180$ radians where $N<10$), which is considered fine-grain phase adjustments. In some cases, these devices can even achieve fully continuous adjustment at fractions less than a degree. These phase control devices are geometrically small compared to the overall footprint of a system of devices and can sometimes be comparable in size to the wavelength of the signal. Comparatively, common TTD devices typically provide coarse adjustment of as much as 10°, 20°, 60°, 90°, and 180°, with step sizes no less than 10° for multiple-state tunable devices. These TTD devices are geometrically large compared to the overall footprint of a system of devices, and are usually much larger in size than the wavelength of the signal. Considering the possibility of splitting the TTD and phase control devices in physical space, an additional derivative advantage henceforth becomes reduced footprint of the ASPS 113 via exclusion of TTD devices.

Figure 9:
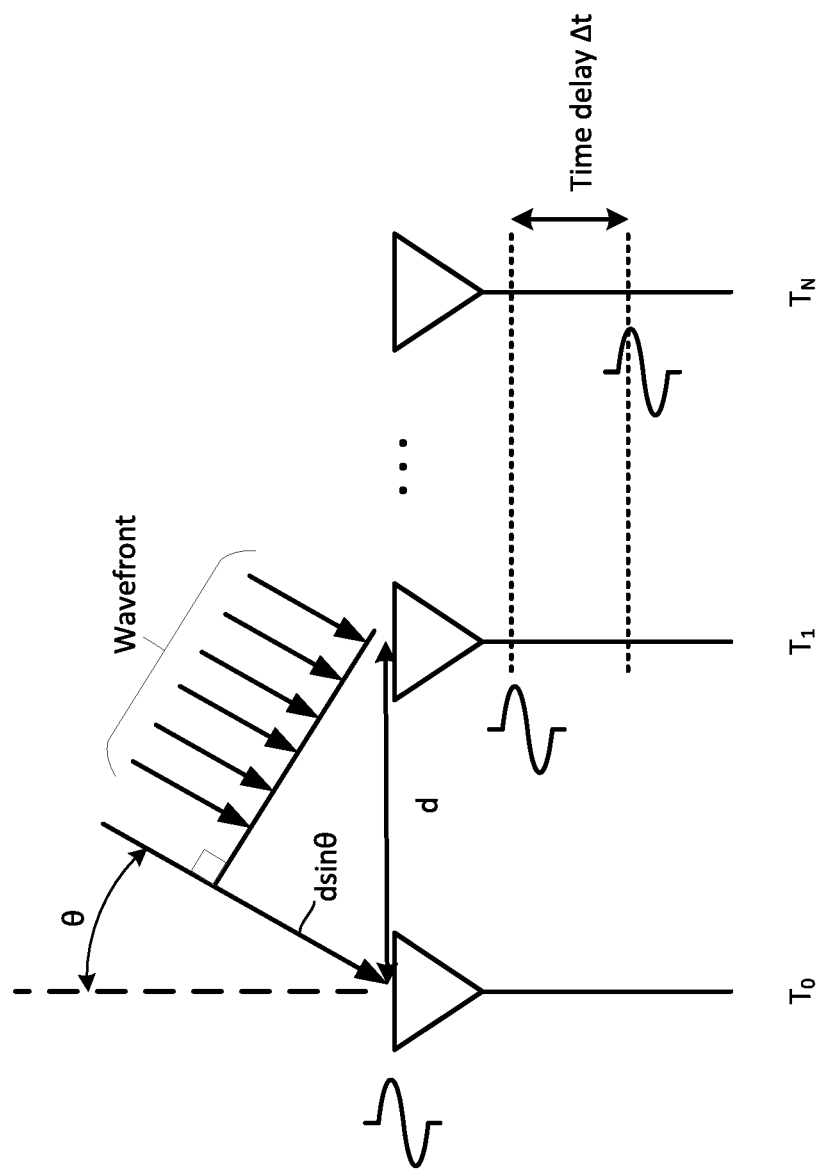
FIG. 9. is a diagram which is useful for understanding signal travel distance of a wavefront with an incoming angle of propagation.

TTD control operations are performed in the TTD-TPM 210 and the TTD-RPM 212. These control operations are described below in further detail with respect to FIG. 9. FIG. 9 is useful for understanding signal travel distance of a wavefront having an incoming angle of propagation θ, across antenna elements spaced by distance d. In the far field, a planar approximation of an incoming wavefront arriving at an angle θ with respect to the normal of the array's major surface, results in an additional d sin θ travel distance for the signal to arrive at successively spaced antenna elements (by d distance). In free space, the time delay between successive elements according to the dimensionality depicted in FIG. 9 is then:

$$\Delta t = \frac{d\sin\theta}{c}$$

Expressed as a phase delay $\Delta\phi$ then gives a frequency-dependence of the arrayed antenna with respect to the incoming signal as follows:

$$\Delta\phi = 2\pi f \Delta t = \frac{2\pi d\sin\theta}{\lambda}$$

An arrayed antenna's gain factor has been shown by M. I. Skolnik, Introduction to Radar Systems, 3rd ed. New York, N.Y.: McGraw-Hill, 2001. As explained therein, an arrayed antenna's gain for a given number of antenna elements, N, is:

$$G_a(\theta, \lambda) = \frac{\sin^2\left[\frac{N\Delta\phi}{2}\right]}{N^2\sin^2\left[\frac{\Delta\phi}{2}\right]} = \frac{\sin^2\left[\frac{N\pi d\sin\theta}{\lambda}\right]}{N^2\sin^2\left[\frac{\pi d\sin\theta}{\lambda}\right]}$$

The distance between elements, d, is typically selected to optimize the gain factor of the array for just one fixed wavelength. However, the antenna array will exhibit different gain factors for signals of differing frequencies. Additionally, it can be observed that the same gain factor will be achieved at differing signal frequencies if those frequencies' steered angles are appropriately different, i.e. $G(\theta_0,\lambda_0)=G(\theta_1,\lambda_1)=G(\theta_2,\lambda_2)$, where $\theta_0 \neq \theta_1 \neq \theta_2$ and $\lambda_0 \neq \lambda_1 \neq \lambda_2$. These properties constitute the primary effects of beam squint.

The main methods to steer any frequency to a desired angle on an array of antenna elements is to apply a true time delay (TTD) or a phase shifter. It is known that applying a TTD to a signal results in a change in the amount of time required to propagate the signal over some distance. To achieve a steered angle $\theta_0$, the change in phase given by a TTD is then given by:

$$\Delta\phi_{TTD} = \frac{2\pi d\sin\theta_0}{\lambda}$$

It is also known that applying a phase shifter to a signal to achieve a steered angle $\theta_0$ will result in a fixed phase shift for a fixed frequency given by:

$$\Delta\phi_{PS} = \frac{2\pi d \sin\theta_0}{\lambda_0}$$

Gain factor is optimized for a steered angle when $\Delta\phi - \Delta\phi_n = 0$. It then follows that to steer to an angle $\theta_0$, $\theta\phi - \Delta\phi_{TTD} = 0$ can be achieved for all frequencies, while $\Delta\phi - \Delta\phi_{PS} = 0$ relies on $\lambda = \lambda_0$.

One method used to achieve TTD in the optical domain consists of employing fixed, switchable waveguide delay lines (i.e., waveguides of known lengths that result in a specific amount of delay that can be selected and combined in a coarse manner). Another method includes the introduction of nonlinear optical media with frequency-dependent time delay, such as photonic crystals. While both methods are technically feasible, the former is superior in terms of manufacturability and compatibility with existing PIC fabrication processes. In general, it is difficult to implement fine granularity control of phase using TTD both optically and electrically, but it is recognized that methods exist in the literature for doing so. Various methods exist to implement phase shifters, including specially-designed micro-ring resonators and other resonant filters. Nearly all optical methods result in very granular and continuous control of phase.

Regardless of the implementation method, the math associated with a true time delay implementation shows that it can be used to correct for the beam squint effects introduced by both the frequency-dependent nature of antenna array size and due to the use of phase shifters. An architecture with both TTD and phase control is advantageous. The solutions proposed herein can further improve system performance by segmenting the TTD and phase control devices in physical space. TTD corrects frequency-dependence of the antenna array (d is optimized for center frequency) and frequency-dependence of the phase shifters ($\varphi$ proportional to wavelength)

Implementation of the RHPS and ASPS

Radio hub photonic subsystems (RHPS) 105 and antenna site photonic subsystem (ASPS) 113 can each be implemented using any suitable arrangement. However, in many scenarios it can be advantageous to implement one or both of these functional components as a hybrid photonic integrated circuit (PIC). As is known a hybrid PIC can include a plurality of separate photonic integrated circuits disposed on a common substrate. In a hybrid integration scenario different PICs can be fabricated on separate wafer substrates comprised of different materials. The various PICS can then be combined mechanically on the common substrate to make the final device.

As is known, each individual PIC can contain multiple optically interconnected components which are fabricated on a particular substrate. These interconnected components function cooperatively to perform certain optical signal processing functions which are described herein. In a hybrid PIC as described herein, optical waveguides can be formed on the common substrate to interconnect one or more of the individual PICs disposed thereon. The exact wavelength of the optical signals used herein is not critical. However, the wavelength can be selected so that it is suitable for operation given the material properties comprising each PIC and the common substrate. In some scenarios, the optical signals can be in the visible or near infra-red wavelength ranges.

A variety of different substrate material types can be used for the PICs and/or the common substrate on which multiple PICs are disposed. For purposes of the present disclosure, any substrate now know or known in the future can be used for implementing the RHPS 105 and/or ASPS 113, provided that such substrate is suitable for integrated waveguide light transport and/or PIC device integration. Exemplary materials suitable for this purpose can include Lithium Niobate, Silicon (Si), glass, and polymeric materials. Other materials can include Silica, Gallium Arsenide (GaAs) or Indium Phosphide (InP) which are sometimes referred to as III-V compounds since they are composed of elements arranged in columns III and V of the periodic table.

Various systems for integrating photonic waveguides and fabricating photonic integrated circuits (PICs) in a photonic substrate are well-known and therefore will not be described here in detail. However, it will be appreciated that such processes can involve various operations including epitaxial growth, waveguide etching, passivation and planarization, metallization and interconnect steps. For several of the embodiments disclosed herein, glass is particularly well suited for use as a substrate material. As is known, optical waveguides formed in glass offer low propagation losses and good matching with respect to optical fibers.

A discussion of optical waveguide fabrication methods using glass substrates is beyond the scope of this disclosure. However, the most basic requirement for confining the light in an optical waveguide is that the guiding material has a refractive index (RI) which is higher than the surrounding media. Fabrication techniques to facilitate this condition can involve one of two conventional approaches, including (1) deposition of a thin film on the glass substrate and (2) local modification of the bulk glass material. Deposition methods can involve radio frequency (RF) and magnetron sputtering and chemical vapor deposition methods, among others. Waveguide formation achieved by local modification of the bulk glass material is conventionally achieved by ion implantation, UV irradiation and femtosecond laser writing. Subsequent processing steps in such formation can involve annealing, photolithography and etching. These and other processes for optical waveguide formation in glass are discussed in various references such as Giancarlo C. Righini, Andrea Chiappini, "Glass optical waveguides: a review of fabrication techniques," Opt. Eng. 53(7) 071819 (14 Mar. 2014).

As noted above, the RHPS 105 and/or ASPS 113 can utilize a fiber optic link 110 to facilitate communications between the central radio hub 102 and the remote site 112. The coupling between the optical waveguides on either of these functional components and the fiber optic link can be facilitated by an optical interface (not shown). An optical interface used for this purpose can comprise various functional features which may include an optical spot size converter. In some scenarios, the optical spot size converter can comprise an adiabiatic taper. As is known, an optical spot size converter can ensure efficient optical coupling between an optical waveguide associated with a hybrid PIC and an external optical fiber 110.

Advantages of Separating Phase and TTD Operations

The communication system architecture described herein has several advantages as compared to conventional communication systems, especially as concerns systems operating in the microwave and/or millimeter wave frequency range. In such frequency ranges, it is advantageous to communicate RF energy to a remote antenna array by utilizing an RFoF approach as described herein. But a dynamic antenna array requires substantial and continuous control signaling. There is an inherent latency associated with communicating such control signaling from a central radio hub to a remote antenna site, and this problem is exacerbated by also performing time delay processing at the remote antenna site. So performing the time delay processing at the central radio hub as described herein will minimize any latency issues with control signaling, at least as concerns time delay processing. Such an approach also minimizes control signaling bandwidth requirements, whereby RF signals and control data can be communicated with as few as one optical fiber extending between a radio hub and a remote antenna.

A further advantage of the architecture described herein is that it can reduce problems of system co-dependence. In any scenario involving the application of a fixed set of bias signals to a set of photonic devices in a confined area, the dissipated thermal energy associated with control operations of one subset of photonic devices has the potential to affect the characteristics/operation of adjacent photonic devices. This interaction can arise due to factors associated with the thermo-optic coefficient of the device substrate(s). By physically separating the TTD functions and control a distance from the phase control, this type of thermal co-dependence is avoided.

In theory it would be possible to investigate the impacts of calibrating the TTD and phase control subsystems in a single photonic circuit or as two separate photonic circuits. However, in an architecture where the circuits are combined, it would likely be necessary to calibrate the entire system at run time. Such an arrangement may not be conducive to ease of installation, minimizing cost, and impact of calibration and setup latency in current and next generation networks. Further, if the TTD and phase control components coexist on the same circuit to control a single antenna element, it is necessary to duplicate both for as many phased array antennas that must be signal-fed. It is recognized that various architectures where these devices coexist in physical space can be realized where fewer TTD or phase control elements are required. It is however asserted here that when separating these devices, it is possible to achieve architectures that will result in an absolute minimum number of photonic devices required for both the RHPS and ASPS.

For example, if the steering and TTD circuits are separated in the manner disclosed herein, then the architecture in FIGS. 1-3 can be modified so that one TTD control system can potentially feed many separate phase controllers. In such a scenario, a single TTD controller can process RFoF signals for a plurality of RF transceivers 104. In such a scenario, a shared TTD system can be used to feed many separate antenna sites, each having their own antenna beam former. Such an arrangement can be advantageous as it is then only necessary to calibrate a controller for the TTD system only once. This arrangement can have a significant positive impact on set-up latency and controller complexity.

Detailed Architecture for Beam Steering in the Optical Domain

Figure 5:
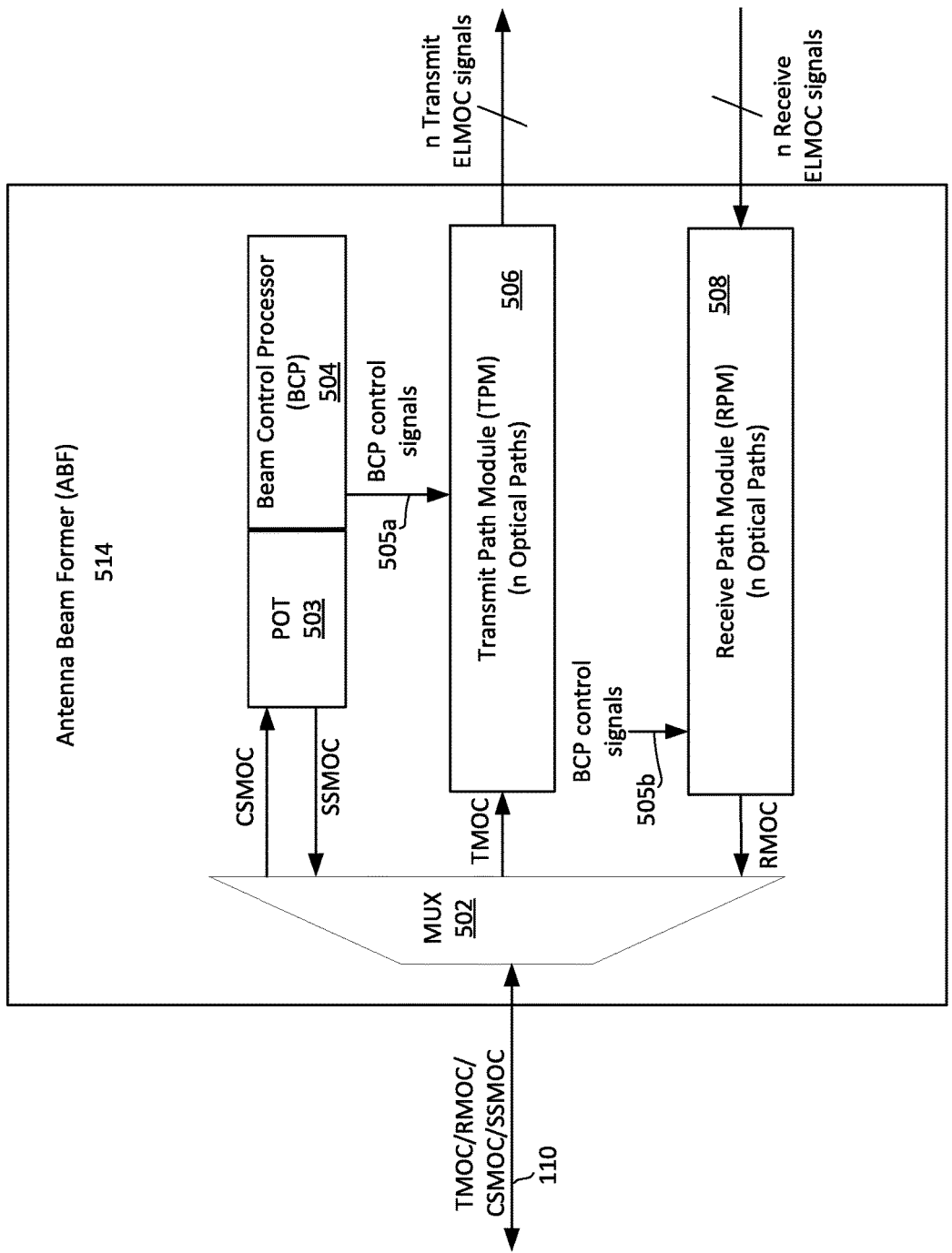
FIG. 5 is a block diagram that is useful for understanding an architecture of an antenna beam former.

As noted above, the phase and gain adjustments applied in the ABF 114 can be performed in the optical domain. These phase and gain adjustments can be performed in any suitable manner whether now known or known in the future. FIG. 5 is a detailed block diagram that is useful for understanding one possible implementation of an ABF which functions in the optical domain. The ABF 514 can be comprised of a transmit path module (TPM) 506 and a receive path module (RPM) 508. The ABF can also include a beam control processor (BCP) 504. As explained above in relation to FIG. 3, wavelength division multiplexing and a protocol optical transceiver (POT) 503 can in some scenarios be used to communicate control signals to and from a BCP 504, using optical transmission means. The function and purpose of the POT is described in greater detail below.

Each of the TPM 506 and the RPM 508 is comprised of a plurality of optical channels (not shown in FIG. 5). In some scenarios, the number of optical channels in each of the TPM 506 and the RPM 508 can be matched to the number of antenna elements in the antenna array. Accordingly, if the antenna array is comprised of n antenna elements, then the TPM 506 and the RPM 508 can each comprise n optical channels. The ABF can also include an optical multiplexer (e.g., a wavelength division multiplexer or WDM) 502. The MUX 502 can facilitate multiplexed communication of both a transmit and receive modulated optical carrier on the optical fiber link 110. Additional detail concerning the TPM 506 and RPM 508, including their purpose and function, is provided below with reference to FIGS. 6-8.

Figure 6:
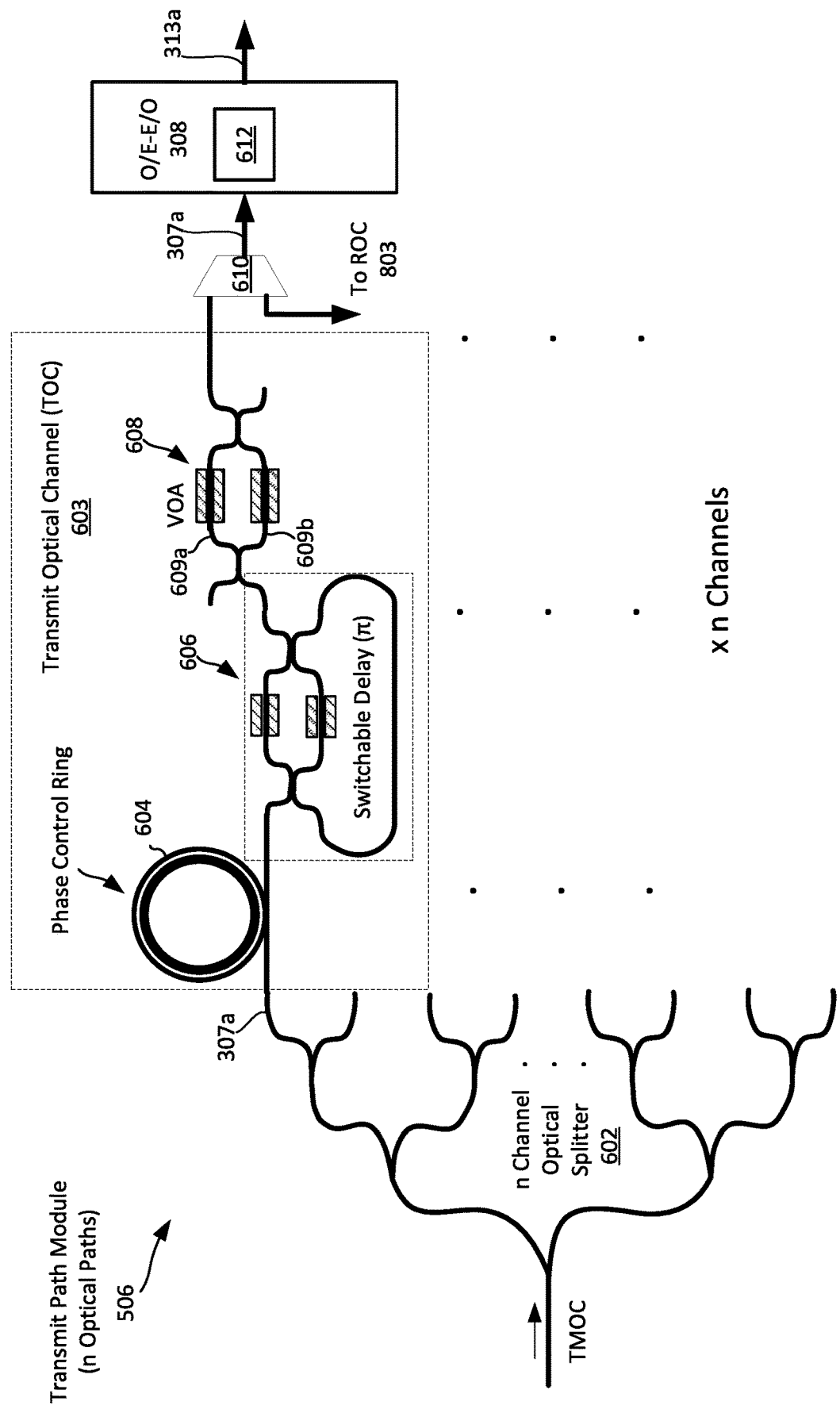
FIG. 6. is a block diagram that is useful for understanding a transmit path module of an antenna beam former of FIG. 5.

Shown in FIG. 6 is a more detailed drawing of an exemplary TPM 506 comprised of n channels. The TPM 506 includes an n-channel optical splitter 602 which splits a transmit modulated optical carrier (TMOC) signal into a plurality n optical signals. The TMOC is an optical carrier signal that has been modulated using an RF signal (e.g., a microwave or millimeter wave RF signal). Each of the n optical signals resulting from the split are sometimes referred to herein as transmit element level modulated optical carrier (ELMOC) signals. Each of the n transmit ELMOC signals is respectively communicated to one of n transmit optical channels (TOCs) 603. In order to facilitate clarity of the disclosure, FIG. 6 shows only a single TOC 603. However, it should be understood that the TPM 506 will include n TOCs, the output of which are to be respectively coupled to n optical conversion interfaces.

The ultimate purpose of each TOC 603 is to facilitate control over the phase and amplitude of an RF transmit signal which has been modulated on the optical carrier comprising the transmit ELMOC signal. As such, each TOC 603 includes, a phase control ring 604, a switchable delay 606, and a variable optical attenuator (VOA) 608. Each of these devices is electronically controlled responsive to control signals (e.g. BCP control signals 505a received from BCP 504). These control signals have been intentionally omitted from FIG. 6 to facilitate greater clarity concerning the features of the TOC. However, it will be appreciated that each of these devices can be controlled by means of an analog or digital electronic control signal that is provided by a control device, such as BCP 504.

It should be noted that the particular order of the phase control ring 604, the switchable delay 606, and the VOA along the optical path of the TOC is not critical and other orderings of these devices are also acceptable. For example, the order of these three components along the optical path could be reversed. Optical waveguides can be used to facilitate communication of the transmit ELMOC signal between the photonic devices along each channel path in the TPM 506.

The optical splitter 602 is a passive optical power distribution device and is designed to distribute an incident optical beam into n optical beams. It should be appreciated that the optical splitter 602 can be any type of optical splitter that is of relatively low loss and suitable for use with the optical wavelengths employed in the system. Passive optical splitters as described herein are well known in the art and therefore will not be described here in detail.

Phase control rings are well-known in the art and therefore will not be described here in detail. Briefly however, it will be noted that the phase control ring 604 is a type of optical ring resonator. Ring resonators are well-known in the art and are commonly used for various purposes such as filters, modulators and so on. In the TOC shown in FIG. 6, the ring resonator is configured as an "all pass" design to exclusively facilitate phase control. In such configurations, the ring resonator will pass all optical wavelengths within a predetermined operating range without significant attenuation, and the predominant effect of the ring resonator upon the transmit ELMOC signal will only be a phase shift effect as described herein.

A phase control ring is a relatively narrow-band device insofar as it will function to vary phase shift of optical signals only over a narrow range of optical wavelengths. In an optical ring resonator as described herein, phase variations can be introduced to an optical signal traversing the ring by dynamically varying the resonant condition of the ring. The phase variation that is produced in an optical ring resonator such as phase control ring 604 can be produced by a variety of methods, all of which involve dynamically modifying the resonant condition of the ring resonator. For example, in a silicon nitride type of ring resonator a thermal variation can be used to vary the phase shift produced by the ring by means of a thermo-optic effect. In such a device, a change in temperature of the optical waveguide will result in a change in refractive index of the waveguide material, which in turn will produce a change in the resonant condition of the ring. This variation in the resonant condition of the ring will then produce the desired phase shift.

In the domain of silicon photonics, other known methods for varying the resonant condition of a ring resonator involve carrier injection into the optical waveguide. Such carrier injection can produce a desired variation in optical waveguide refractive index, and consequently in ring resonant condition. In a lithium niobate type of ring resonator, an electric field applied across the optical waveguide can cause a variation in the waveguide refractive index, which in turn will produce a variation in the resonant condition of the ring. In some scenarios, the phase control ring 604 is a thermally tuned ring resonator, with its resonance tuned to the wavelength of optical carrier used in the system. This type of ring resonator functions by changing the phase of the optical carrier with respect to the phase of the microwave or millimeter-wave sideband. As such the phase control ring 604 can facilitate variable phase adjustments within a predetermined range.

The predetermined phase tuning range of a phase control ring 60 will vary with the particular design but will always be less than 360°. For example, in some scenarios a phase control ring as described herein will provide phase a phase adjustment range of between about 0° and 70°. In other scenarios, a phase adjustment ring can provide a phase shift adjustment range of between about 0° and 300°. In still other scenarios, a phase shift adjustment range of a phase control ring can be between about 0° and 350°.

Figure 7:
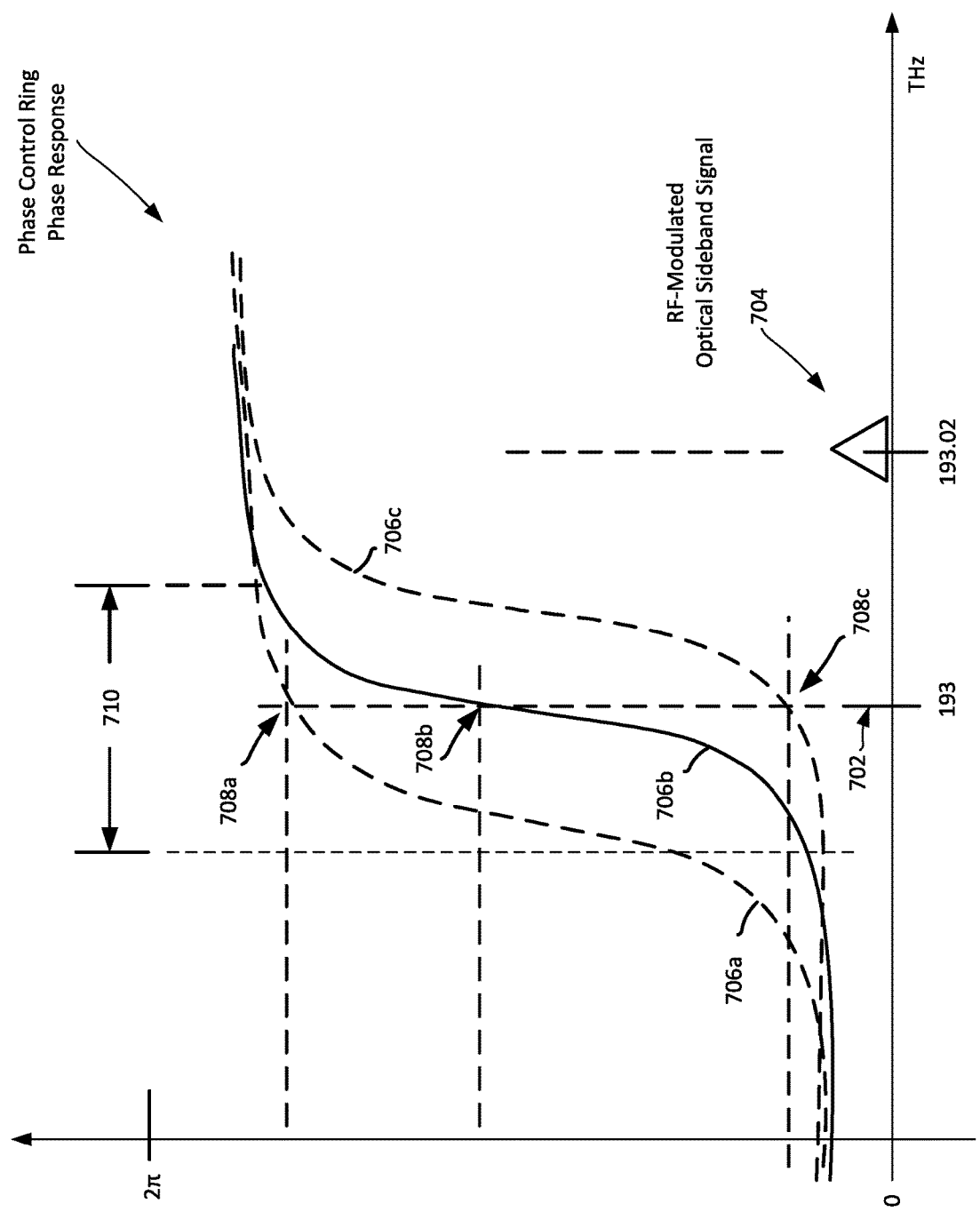
FIG. 7 is a plot which is useful for understanding a phase response of a phase control ring.

The function of the phase control ring 604 is illustrated in FIG. 7 which shows a scenario in which a 20 GHz microwave signal is modulated on a 193 THz optical carrier. The transmit ELMOC signal in this scenario will comprise an optical carrier signal 702, plus an optical sideband signal 704 produced as a result of the modulation process. The optical sideband signal 704 will contain the information comprising the transmit RF signal which was used to modulate the optical carrier. As shown in FIG. 7, a phase response curve 706b of the phase control ring will include a dynamic region 710 where the magnitude of the phase shift introduced by the ring is highly dependent on the frequency of the applied optical carrier signal. In the case of phase response 706b, it can be observed that this dynamic region is approximately aligned with the frequency of the optical carrier 702. However, controlled adjustments in the resonant condition of the phase control ring 604 will cause changes in the phase response of the ring. These changes will generally involve a shifting of the dynamic region 710 along the frequency axis so that a variable selected phase shift is applied to an optical carrier signal 702.

For example, in FIG. 7 it can be observed that a first resonant condition will result in a phase response curve 706a, a second resonant condition will result in phase response curve 706b, and a third resonant condition will result in a phase response curve 706c. Note that the change in resonant condition will result in a change in the phase shift caused at the optical carrier frequency. Accordingly, a phase shift applied to an optical carrier signal 702 will be different depending on the resonant condition of the ring. For example, in FIG. 7, optical carrier signal 702 will experience a first phase shift 708a when the resonant condition in the ring results in the phase shift curve 706a, a second phase shift 708b when the resonant condition of the ring results in the phase shift curve 706b, and a third phase shift 708c when the resonant condition of the ring results in the phase shift curve 706c.

It can be observed in FIG. 7 that the dynamic region 710 of the phase control ring 604 extends over a relatively narrow range of optical frequencies. In this frequency range relatively small changes in the resonant condition will substantially change the phase of a first optical signal in the frequency range of the dynamic region, without substantially affecting the phase of optical signals outside the frequency range of such region. For example, in FIG. 7 it can be observed that a phase variation can be applied to the optical carrier 702 at 193 THz without significantly affecting the phase of the RF modulated optical sideband 704 at 193.02 THz.

From the foregoing it can be appreciated that the phase control ring 604 can shift the phase of the optical carrier 702 as compared to the phase of the RF-modulated optical sideband 704. This characteristic is attributable to the relatively narrow bandwidth of the dynamic region 710. Consequently, with the arrangement described herein, the phase of the optical carrier 702 can be adjusted independently of the phase of the RF modulated optical sideband 704. The result is that a phase difference can be selectively caused in each transmit ELMOC signal as between the optical carrier and the RF signal-modulated optical sideband. Of course it should be understood that the frequency of the optical carrier and the microwave signal described in relation to FIG. 7 are provided merely by way of example and are not intended to limit the scope of the present disclosure in any way. Rather, the ABF can implemented for a wide range of optical carrier signals and microwave (or millimeter wave) RF signals, without limitation.

As noted above, a single phase control ring 604 will always provide less than 360° or $2\pi$ radians of phase shift. But it is advantageous in beam steering operation for each TOC 603 to have the ability to apply a full 360° or $2\pi$ radians of phase shift to the optical carrier component of each transmit ELMOC signal. To ensure that each TOC can provide such a phase shift, a second phase control ring 604 could be added along the optical path to increase the range of phase control by a factor of two. However, in some scenarios a switchable delay element 606 can instead be provided along the optical path in the TOC. The switchable delay element 606 can selectively add 180° or $\pi$ radians of delay along the optical path in the TOC 603. Accordingly, by coordinating the operation of the phase control ring 604 and the switchable delay element 606, a greater range of control can be achieved with relatively low power consumption.

As is known, pure beam-steering of phased arrays is achieved through true time delay of the signal applied to each antenna element, whereby the various antenna elements of an array receive delayed versions of the same signal. In a scenario disclosed herein, the phase control ring 604 adjusts the phase difference of the optical carrier with respect to the optical sideband and approximates beam-steering for small arrays, small angles, and small bandwidth signals. But a single ring based phase shifter does not give a full+/−π phase shift. Instead of using a second phase control ring, the switchable delay element 606 is provided which gives enough delay to correspond to a π phase shift of the RF signal. The switchable delay element 606 is a true time delay element and therefore does not adjust the relative phases between the optical carrier and the optical sidebands.

Optical delay elements are well-known in the art and the exact configuration of the switchable delay 606 is not critical. However, the device should be capable of selectively adding or inserting an optical delay of 180° or π radians in the optical path of the TOC in response to a control signal. In this regard it will be understood that the switchable delay 606 can change the path length when needed by increasing the path length by an amount equal to 180° or π radians at the wavelength of the optical carrier. In the scenario shown in FIG. 6, the switchable delay element is a binary switch delay, which is well-known in the art and commonly used in fiber based optical delay systems. Still, it should be understood that other types of switchable optical delay lines now known or known in the future can be used without limitation.

One advantage of using a switchable delay element 606 as described is that it tends to have a lower power consumption as compared to the addition of a second phase control ring 604. A further advantage of this approach is that use of the switchable delay element can simplify the necessary control circuitry in the TOC 603 as compared to the use of two phase control rings. Of course, in a scenario where these factors are not a concern, a second phase ring 604 could be used instead of the switchable delay 606 to facilitate the full 360° or 2π radians of phase control.

The VOA is added to tune the amplitude of the transmit ELMOC signal. VOA elements in the field of optics are well-known in the art and the exact configuration of the VOA 608 is not critical provided that it does not otherwise introduce unwanted phase variations in the optical carrier relative to the optical sideband. In a scenario shown in FIG. 6, the VOA can be comprised of a tunable arrangement whereby the amount of optical power passed through the device to O/E-E/O optical interface can be continuously varied over a predetermined range (e.g., 0 to 100%) in response to a control signal.

In some scenarios, the VOA 608 can comprise an interferometric device which operates by splitting an input optical signal (the transmit ELMOC signal) into two optical paths 609a, 609b. Thereafter, a broadband phase difference will be introduced as between the transmit ELMOC signal communicated along each path. For example, this broadband phase difference can be introduced by first and second refractive index tuning elements which are respectively disposed along each optical path. These refractive index tuning elements can cause selective variations in the refractive index along each path so as to produce the desired phase shift to signals traversing each path. The refractive index variations can be implemented using a thermo-optic effect, carrier injection, electro-optic effect or any other suitable tuning mechanism. When the signals traversing the two paths are subsequently recombined, the amount of phase difference introduced between the two paths will determine the extent to which the signals will constructively add, or destructively subtract from each other.

It should be noted that in an interferometric type VOA device as described, the broadband phase shift introduced is different from the narrowband phase shift operations performed in the phase control ring 604. As explained with reference to FIG. 7, the narrowband phase shift introduced in the phase control ring 604 will produce a phase shift in the optical carrier 702 while not affecting the phase of the RF modulated optical sideband signal 704. This results in a selectively variable phase difference between the carrier and the optical sideband. In contrast, the broadband phase shift introduced in an interferometric type VOA 608 will concurrently introduce a phase shift into both the optical carrier signal and the optical sideband produced as a result of the RF modulation. Since phase variations are concurrently introduced to both signals in the interferometric type of VOA 608, there will be no phase difference or variation caused as between the optical carrier signals and the optical sideband signal.

Other types of VOA devices can also be used for variably attenuating the modulated optical signal. For example, in some scenarios an electro-absorption type of VOA can be used in which an absorption or attenuation of a certain optical wavelengths in an optical waveguide is varied in response to changes in an applied electric field. Other alternatives to varying attenuation can involve selectively flooding the optical waveguide with electrons to increase attenuation. The specific mechanism used to perform the variable attenuation function is not critical and any type of VOA whether now known or known in the future can be used for this purpose.

After passing through a respective TOC 603, each of the n transmit ELMOC signals 307a is respectively communicated to one of the optical conversion interfaces (e.g., O/E-E/O 308). Here a linear photodetector 612 (sometimes referred to as a linear optical demodulator) extracts the RF signal information from its respective transmit ELMOC signal 307a, and produces the phase and gain adjusted transmit ELMRF signal 313a as an output. The optical demodulator 612 that is used for this purpose can be included a part of an O/E-E/O 308 discussed in FIG. 3. The linear photodetector converts the phase and amplitude adjusted modulated RF signal contained in the transmit ELMOC signal, back to an RF signal so that it is ready to be used for exciting an antenna element.

Linear photodetectors as referenced herein are well known in the art and therefore will not be described detail. However, it should be understood that such devices will commonly include a solid state semiconductor element which varies an electric current responsive to the incident optical signal. As is known, a continuous wave optical carrier signal will be converted by the photodetector to a DC output signal. But an optical carrier 702 and its RF modulated optical sideband 704 will interfere with each other at the photodetector so that an alternating electrical current variation is introduced in the DC output of the photodetector. This alternating electrical current variation will correspond to the original modulated RF signal, phase shifted and gain adjusted in accordance with the operations of the TOC The TPM 506 is advantageously configured to facilitate selective independent adjustment of both the amplitude and RF phase of the modulated RF signal contained in each of the n transmit ELMOC signals as they are communicated along each of the n paths defined by the TOCs 603.

Each of these n independent transmit ELMRF signals are then respectively coupled to one of the n antenna elements, as shown in FIG. 3. Notably, each of these transmit ELMRF signals will have an RF phase and amplitude that is independently controlled in accordance with the adjustments made in its respective TOC 603. These RF signals are then respectively used to feed the n antenna elements 120 so as to form a desired antenna beam.

As shown in FIG. 6 an optical diplexer 610 can be provided for each TOC 603. In some scenarios, the diplexer can be a WDM type diplexer. If used, the purpose of the diplexer 610 is to facilitate full duplex communications between the TOC and the optical conversion interface (e.g., O/E-E/O 308). For example, this result can be facilitated by providing concurrent communication of both an transmit ELMOC signal and a receive ELMOC signal on a single optical waveguide which is used to facilitate communication between these element. However, embodiments are not limited in this regard and in some scenarios separate optical waveguides can instead be utilized respectively for the transmit and receive ELMOC signals. As a further alternative, the system can be set up for half duplex operation such that the transmit and receive ELMOC signals are communicated over the optical waveguide at different times.

Figure 8:
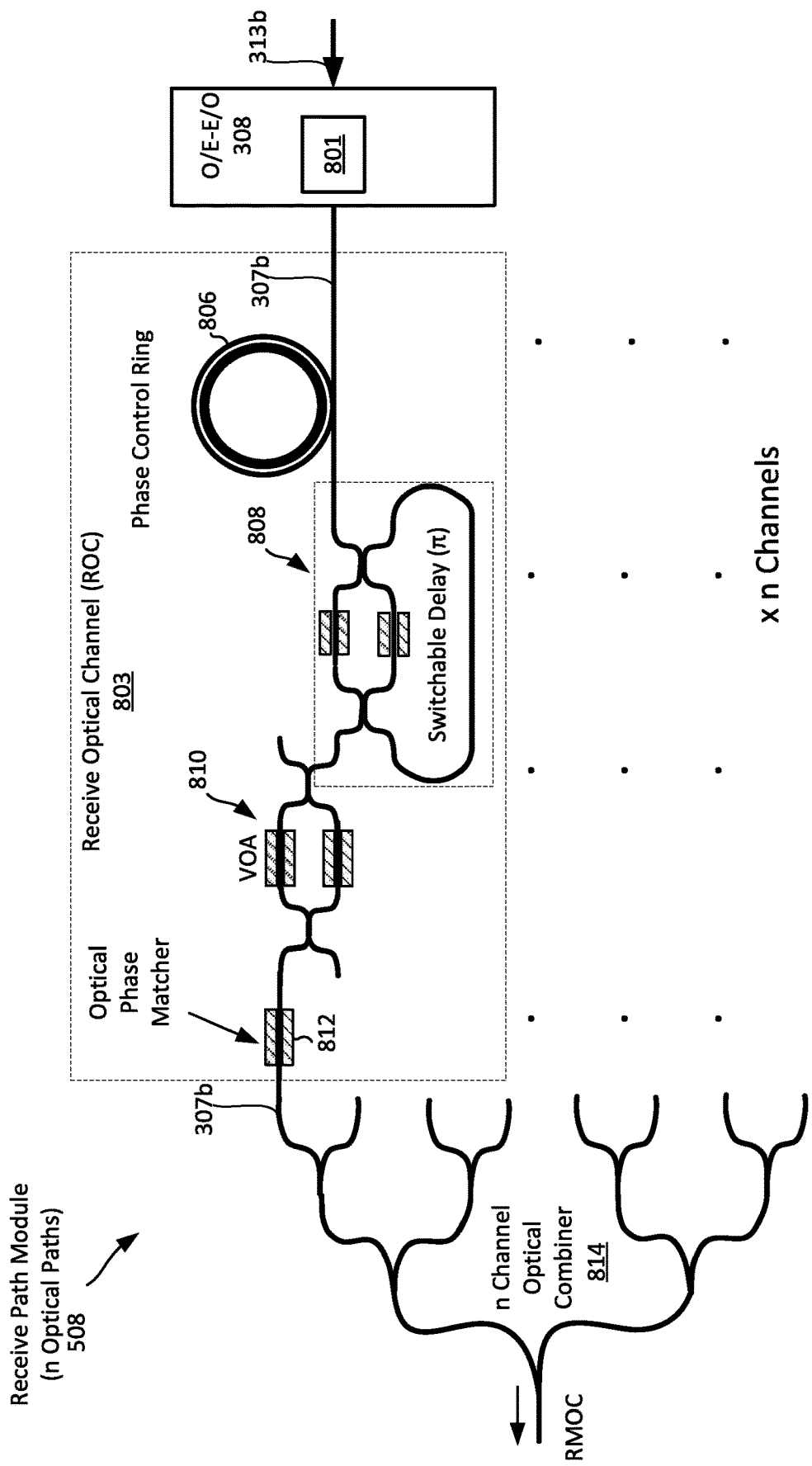
FIG. 8 is a block diagram that is useful for understanding a receive path module of the antenna beam former in FIG. 5.

Shown in FIG. 8 is a more detailed drawing of an exemplary RPM 508. The RPM 808 includes n receive optical channels (ROCs) 803. In order to facilitate clarity of the disclosure, FIG. 8 shows only a single ROC 803. However, it should be understood that the RPM 808 will actually include n ROCs 803 that are optically coupled to n of the O/E-E/O optical interfaces 308. As noted above, this communication can in some scenarios be facilitated by means of an optical diplexer 610.

Within each O/E-E/O optical interface 308, an RF receive signal from a corresponding antenna element is communicated to a linear optical modulator 801. The linear optical modulator utilizes the RF receive signal from the antenna element as an exciter signal to excite or modulate an optical carrier signal. The resulting signal is referred to herein as the receive ELMOC signal 313b. As is known, a linear optical modulator 801 will produce a resulting output which includes the original optical subcarrier and an optical sideband signal, which is offset in frequency from the frequency of the optical carrier.

The ultimate purpose of each ROC 803 is to facilitate control over the phase and amplitude of each receive ELMRF signal 313b which has been modulated on the receive ELMOC signal. Within the ROC 803, this control is asserted by using optical processing means similar to those described herein with respect to the TOC 603. As such, each ROC 803 includes, a phase control ring 806, a switchable delay 808, a variable optical attenuator (VOA) 810, and an optical phase matcher 812. Each of these devices is electronically controlled using suitable analog or digital control signals. For example, these devices may be controlled by using BCP control signals 505b received from a BCP 504. The control signals for the phase control ring 806, the switchable delay 808, the VOA 810, and the optical phase matcher 812 have been intentionally omitted from FIG. 8 to facilitate greater clarity of the disclosure.

It should be noted that within the ROC 803, the particular order of the phase control ring 806, the switchable delay 808, and the VOA 810 along the optical path is not critical and other orderings of these devices are also acceptable. For example, the order of these components along the optical path could be reversed. Optical waveguides are used to facilitate communication of the receive ELMOC signal 307b between the various photonic devices along each channel path in the RPM 808. The characteristics of the phase control ring 806, the switchable delay 808, and the VOA 810 are similar to the phase control ring 604, switchable delay 606 and VOA 608. Accordingly, the description of these elements provided above is sufficient for understanding the phase control ring 806, the switchable delay 808 and the VOA 810.

The n receive ELMOC signals 307b are respectively communicated from the O/E-E/O optical interfaces 308 to the ROC 803. Within each ROC 803 a phase difference is selectively controlled as between an optical carrier and optical sideband comprising each receive ELMOC. Likewise, an amplitude of each receive ELMOC signal is selectively controlled. The amplitude and phase adjustments in each channel are applied independently in each ROC so that different phase and amplitude adjustments can be applied in each ROC. For example, these values can be independently controlled in response to control signals 505b received from BCP 504. These adjustments can be used so as to steer and form a desired receive antenna beam for receive operations.

After having the necessary phase and amplitude adjustments applied to facilitate any necessary beam-control operations, the n receive ELMOC signals are combined into a single receive modulated optical output signal (RMOC) by the n-channel optical combiner 814. The n-channel optical combiner can be a passive optical power combiner which is designed to combine a plurality of n incident optical beam into a single optical beam. It should be appreciated that the optical combiner 814 can be any type of optical combiner that is of relatively low loss and suitable for use with the optical wavelengths employed in the system. Passive optical combiners as described herein are well known in the art and therefore will not be described here in detail.

In FIG. 8, the purpose of the optical phase matcher 812 is to ensure that the optical carrier portion of each receive ELMOC signal from each TOC is combined constructively in the n-channel optical combiner. Recall that each receive ELMOC signal traversing each ROC 803 will actually comprise an optical carrier and an optical sideband signal produced as a result of the optical modulator function. For combining purposes, it is necessary to consider the phase of the optical carrier in each ROC path as compared to a phase of the optical carriers in the other ROC paths. In the transmit direction, this is not an issue because there is no need to re-combine the optical carriers. But in the receive direction, a failure to properly align the phase of the optical carriers comprising each receive ELMOC signal will result in destructive interference when the signals are combined in the n channel optical combiner 814.

The phase of an RF signal that is ultimately reproduced from each receive ELMOC signal is based on a phase difference between the optical carrier and the optical sideband. So it is important that the optical phase matcher 812 preserves this important phase information while matching the phase of the optical carrier of each receive ELMOC signal. Accordingly, the design of the optical phase matcher 812 is advantageously selected so that it will concurrently result in an approximately equal phase shift in both the optical carrier and its associated optical sideband signal contained in each receive ELMOC signal. In this regard, the optical phase matcher 812 is preferably a broadband design capable of facilitating approximately equal phase shifts in both the optical carrier and the optical sideband of each receive ELMOC signal traversing through each ROC.

The exact design of such optical phase matcher 812 is not critical provided that it is capable of performing broadband phase shifts as described herein. Exemplary techniques that can be used for affecting such broadband phase shifts are known in the art and therefore will not be described here in detail. However, such techniques can involve the use of a refractive index tuning element disposed along the optical path. In such elements, selective variations in the refractive index can produce the desired phase shift to signals traversing each path. The refractive index variations can be implemented using a thermo-optic effect, carrier injection, electro-optic effect or any other suitable tuning mechanism.

As with the optical carrier portion of the receive ELMOC signal, the optical sideband portion will also be combined in the n channel optical combiner 814. However, in the case of the n optical sideband signals, the phase offsets respectively introduced in each of the ROCs 803 will result in a controlled combing operation that facilitates beam steering in the receive direction. Phased array techniques to facilitate such beamforming are well known in the art and therefore will not be described here in detail. Likewise, gain offsets respectively introduced in each of the n ROCs can be used for receive channel beam shaping operations (e.g. sidelobe suppression and beam shaping) in accordance with known phased array techniques.

When received at a central radio hub 102, the single RMOC signal output from the combiner 814 can be coupled to a photodetector (O/E-E/O 106) to extract the combined receive channel RF signal information. The RF signal is then processed further in an RF transceiver 104. For example, the received signal can be demodulated or processed in a signal processing system associated with RF transceiver to extract data which has been communicated by means of the RF signal.

The ROC architecture shown in FIG. 8 assumes a single sideband modulation, which can be facilitated by utilizing a Mach-Zehnder modulator (MZM) as the optical modulator in the O/E-E/O optical interface 308. But in some scenarios, it can be advantageous to instead use a ring-based modulator in the receive path rather than an MZM type modulator. For example, a ring-based modulator in the receive path can be advantageous for purposes of facilitating improved receiver sensitivity performance.

Although a ring-based modulator can have certain advantages, one potentially negative aspect is that these types of modulators will generally produce dual sideband modulation. In other words, a receive ELMOC signal produced using a ring-based modulator will have an optical sideband both above and below the frequency of the optical carrier comprising each receive ELMOC signal. Such a dual sideband signal can present some problems with respect to the phase control ring 806. A ring-based phase shifter such as phase control ring 806 generally will not work well with dual sideband modulation as such phase shifters are relatively narrowband devices and can introduce distortion into the lower sideband of the receive ELMOC signal.

In order to overcome this problem various solutions are possible. For example, in one scenario, a dual sideband receive ELMOC signal can be filtered down to a single sideband. The optical filter component can be disposed in FIG. 8 before the input to the phase control ring 806 so as to remove the unwanted sideband signal. In such a scenario, a ring-based phase shifter arrangement (i.e., phase control ring 806) can provide satisfactory results. Alternatively, the receive ELMOC signal can be allowed to remain as a dual sideband signal, in which case a multi-ring phase shifter (not shown) can be utilized such that the phase of both optical sidebands is shifted relative to the optical subcarrier. Also, other system architectures can be implemented that do not use ring-based phase shifters, and these architectures can be more suitable for systems that use ring modulators producing dual sideband modulation. Accordingly, the methods and systems disclosed herein are not limited to the architecture shown in FIG. 8.

The ABF architecture described with respect to FIGS. 5-8 is one example of an optical processing architecture that can be used to facilitate phase and gain adjustments in an ABF. However, it should be understood that the approach shown in FIGS. 5-8 is not intended to be limiting of the various architectures which are contemplated. In other scenarios, different architectures are also possible and all such architectures are contemplated for use herein, whether now known or known in the future.

Interprocessor Communications Overview

It will be appreciated that the above-described phased array antenna system which is remote from the radio hub will require substantial and continuous control signaling if the ACU 202 is to be located at the central radio hub 102. The control signaling should occur substantially concurrent with the communicated RF, and should be provided to the BCP 310 in real time. Further, the control signaling should be transmitted and received with minimal timing variation so that the antenna beam boresight direction can be rapidly redirected in coordination with the RF signal payload data. Satisfying all of the foregoing criteria is particularly advantageous in an environment involving communications from the antenna array 118 with a multiplicity of communication devices.

Local communications between a master device (such as a processor or microcontroller) and various peripheral processing elements are commonly implemented in the electrical domain using a variety of conventional techniques. For example, conventional electrical interfaces which can be used for this purpose include the Inter-Integrated Circuit (I2C) interface, Serial Peripheral Interface (SPI), RS232, and the Universal Serial Bus (USB). Many microcontrollers also provide a General Purpose Input/Output (GPIO) interface. These GPIO interfaces generally include one or more pins which can be programmed to either accept inputs or provide outputs to external devices. For example, some microcontrollers include groups of eight pins which can be configured for communicating data. The behavior of these pins can be programmed by means of software.

The various types of electrical interface mentioned above are usually limited in their application with regard to trace or cable length. These limitations are commonly attributable to dispersion and attenuation characteristics of copper traces or conductors used to communicate the electrical signals. For example, I2C and SPI are each designed to operate over relatively short distances (e.g., within the same printed circuit board). USB and RS232 can facilitate somewhat longer distances. For example, USB can be used over distances up to about 5 meters and RS232 can facilitate baud rates up to 9600 at distances up to about 15 meters. GPIO is similarly limited with regard to the distance that can be tolerated between a sending device and a receiving device.

So, while the foregoing electrical interfaces can provide a satisfactory solution for systems where all of the processing elements are within a relatively short distance, they would not work well for a system as described herein where the separation distance d between a centralized radio hub 102 and the remote site 112 can be on the order of 0.1 to 10.0 kilometers or more. A conventional approach to addressing the foregoing problem could involve the use of Ethernet framed applications. But even this approach is not satisfactory because it require substantial amounts of processing.

Such processing is needed to collect information at high levels of a microprocessor protocol stack and further processing is then required to push the information down to physical layers. The substantial amounts of processing required to facilitate these operations means that they are not well suited for real-time communications between an ACU 202 at a centralized radio hub 102 and a beam control processor 310 located at remote antenna site(s) 112. In particular, such communication methods tend to have both high latency and high timing variance. Further, they increase the cost of the hardware at the antenna site, and result in significantly higher levels of power consumption.

Fiber Bus Extender

Figure 10:
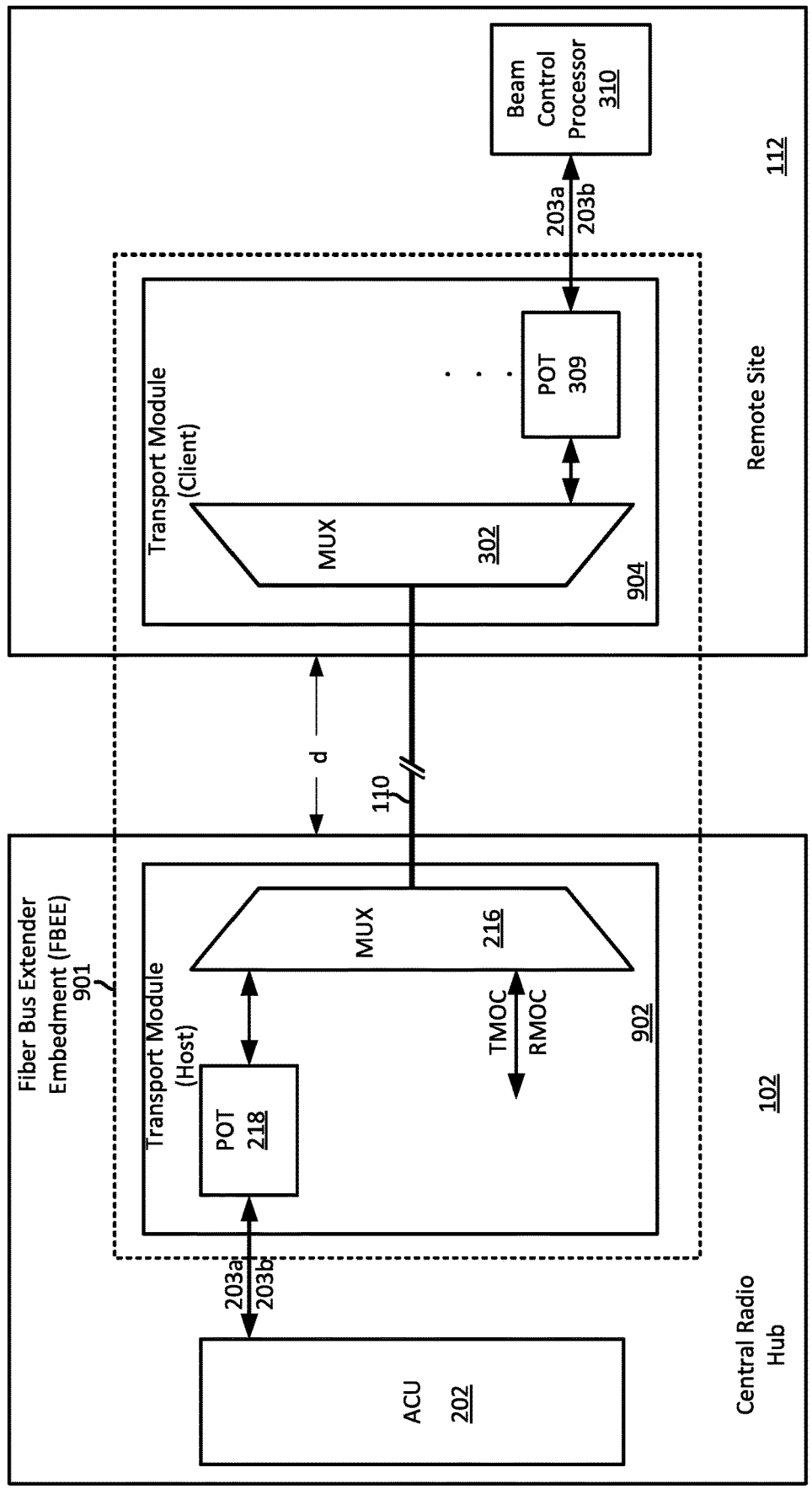
FIG. 10 is a block diagram that is useful for understanding a fiber bus extender embedment (FBEE) which facilitates communication between a central radio hub and a remote antenna site.

Turning now to FIG. 10, there is shown a block diagram that is useful for understanding how a moderate to high speed data communication interface can be provided between a ACU 202 and a remote BCP 310. The disclosed arrangements facilitate data rates between 1-100 Mbps or more and interface distances ranging from 1 meter to 1000 meters or more.

For purposes of the present discussion, the exact nature of the processing devices used to implement the ACU 202 and/the BCP 310 are not critical. For example, one or both of these devices can be implements as a microprocessor, a microcontroller, and or an ASIC. Each of the ACU and the BCM can be configured to communicate in accordance with a conventional electronic interface standard. Examples of such conventional electronic interface standards which may be used for this purpose include I2C, SPI and/or GPIO. Of course, other interface standards whether now known, or known in the future can also be used.

In the system shown in FIG. 10, a fiber bus extender embedment (FBEE) 901 is advantageously provided to facilitate direct long-distance communications (e.g. up to 1000 meters or more) between ACU 202 and the BCP 310. The FBEE will allow the BCM 310 to appear to the ACU 202 as though the two devices are locally directly connected by means of a standard electronic interface bus. Likewise, the FBEE will allow the ACU 202 to appear to the BCP 310 as though it is locally directly connected by means of a standard electronic interface bus. From the standpoint of the ACU 202 and the BCP 310 the FBEE is essentially transparent.

The FBEE can be understood as being comprised of transport modules 902, 904 which facilitate a moderate to high speed interface between the ACU 202 and the BCP 310. The transport module 902 is a host module which can interface directly with a ACU 202 or any other device operating a standard electrical interface protocol (e.g., I2C, SPI, GPIO or others). The transport module 904 is a client module which can directly interface with BCP 310 in accordance with a standard electrical interface protocol.

The transport modules 902, 904 are each respectively comprised of a protocol optical transceiver (POT) 218, 309. Each POT 218, 309 is comprised of an electronic interface which is compatible with a predetermined electrical interface standard. The electrical interface standard can be any interface standard that is now known or known in the future. For example, in some scenarios. the electronic interface can be conformed to a conventional electronic interface standard such as SPI, I2C, GPIO or some other interface standard which is now known or may be known in the future. According to one aspect, the electrical interface in the POTs 218, 309 is a bidirectional electronic interface which facilitates both transmit and receive operations as shown.

Each POT 218, 309 also includes one or more conversion O/E-E/O conversion devices which are respectively coupled to the electronic interface associated with a particular POT. Accordingly, at least an electro-optic (EO) one of the conversion devices can be configured to convert electrical signals into optical signals, and at least an opto-electric (OE) one of the conversion devices can be configured to convert optical signals to electrical signals. Various types of EO and OE conversion devices are well known in the art and therefore will not be described here in detail. However, it will be appreciated that an EO conversion device can include an optical modulator and an OE conversion device can include a photodiode or other type of photodetector.

Each POT 218, 309 can receive electrical signals in accordance with a predetermined electrical interface standard. High speed optical modulators within each POT convert such signals to optical signals, and communicate and/or couple such signals to one or more optical fibers (e.g., an optical fiber associated with optical fiber link 110) for transport. When received at a distant end of the optical fiber link 110, a POT 218, 309 can convert such signals to a predetermined electrical interface standard and output the electrical signals. According to one aspect, the electrical interface in the POT at a receiving end of the link is advantageously configured to output electrical signals which conform to the same interface standard as those which were received at the source transport module. Accordingly, the optical interface can be made essentially transparent to the ACU 202 and the BCP 310. Proper impedance matching networks and signal level adjustments are all handled by the electrical interface to ensure that the POT is compatible with the electrical interface standard that is in use.

In some scenarios, each POT 218, 309 can be configured to produce an optical output signal having a different wavelength. This can be advantageous when a single optical fiber is used to form the optical link 110. Further, the optical wavelength used by the POTs can be different from an optical wavelength that is used for RFoF signals which are communicated over the optical link. By using conventional wavelength division optical multiplexing techniques, these optical signals of different wavelength can be combined or multiplexed onto the same optical fiber at the central radio hub 102 and then de-multiplexed into separate optical signals at the remote antenna site 112 where the optical signal is received.

One drawback of a wavelength division multiplexing is that it requires a separate laser having a different wavelength for each physical channel. Accordingly, an alternative solution could optionally be configured to instead utilize time division multiplexing (TDM). As with wavelength division multiplexing, a TDM type optical multiplexing arrangement can facilitate use of a single optical fiber for communicating a plurality of different signals. In a TDM type system, only a single wavelength of optical signal is used, but the various signals are serially transmitted at different times. While TDM offers some advantages, it also presents other challenges relating to the serialization of data and the need for a clock signal to facilitate the de-multiplexing.

Each transport module 902, 904 as described herein can in some scenarios be configured as a multi-chip module (MCM) or system-in-package (SIP) module. For example, each POT can be comprised of a photonic integrated circuit (PIC) which is integrated in the MCM together with an electronic integrated circuit to facilitate the electronics interface. In other scenarios, Silicon photonics can be used to facilitate integration of the electronic interface and the optical components of the system on the same silicon substrate. Accordingly, an entire transport module (including the POT and MUX can be an application specific integrated circuit (ASIC) provided in a single device package.

The FBEE system disclosed herein will provide a relatively low-cost easy to deploy control signal transport solution for controlling the phased array (including the beamforming operations) at the remote antenna site. With the FBEE system as described, the BCP 310 can appear local to the ACU 202. Similarly, the ACU 202 will appear local to the BCP 310.

Since different POTs 218, 309 can be configured to exhibit electrical characteristics in accordance with different predetermined types of electronic interface standards, the FBEE disclosed herein can support different electrical interfaces between different pairs of POTs 218, 309. Further, multiple devices and systems having the same or different electronic interfaces can be supported from central radio hub 102. In other words, a first pair of POTs 218, 309 associated with a first remote site 112 could support an SPI interface, a second pair of POTs 218, 309 associated with a second remote site 112 could support an I2C interface, and a third pair of POTs 218, 309 associated with a third remote site 112 could support a GPIO interface.

In a scenarios where BCP 310 utilize a different standard electronic interface as compared to an ACU 202, one or both POTs 218, 309 can be configured to perform high-speed interface translation operations whereby electronic data signals received at a first POT in accordance with a first electronic interface standard are converted to a second electronic interface standard which is different from the first. These interface standard conversion operations can be performed at a POT 218 and/or at POT 309. The interface translation operations can include adjustments or modifications to data format, data coding, signal levels, signal timing, message types and so on. Accordingly, it will appear to both devices as though they are communicating using the same electronic interface standard, when in fact they are not.

Figure 11A:
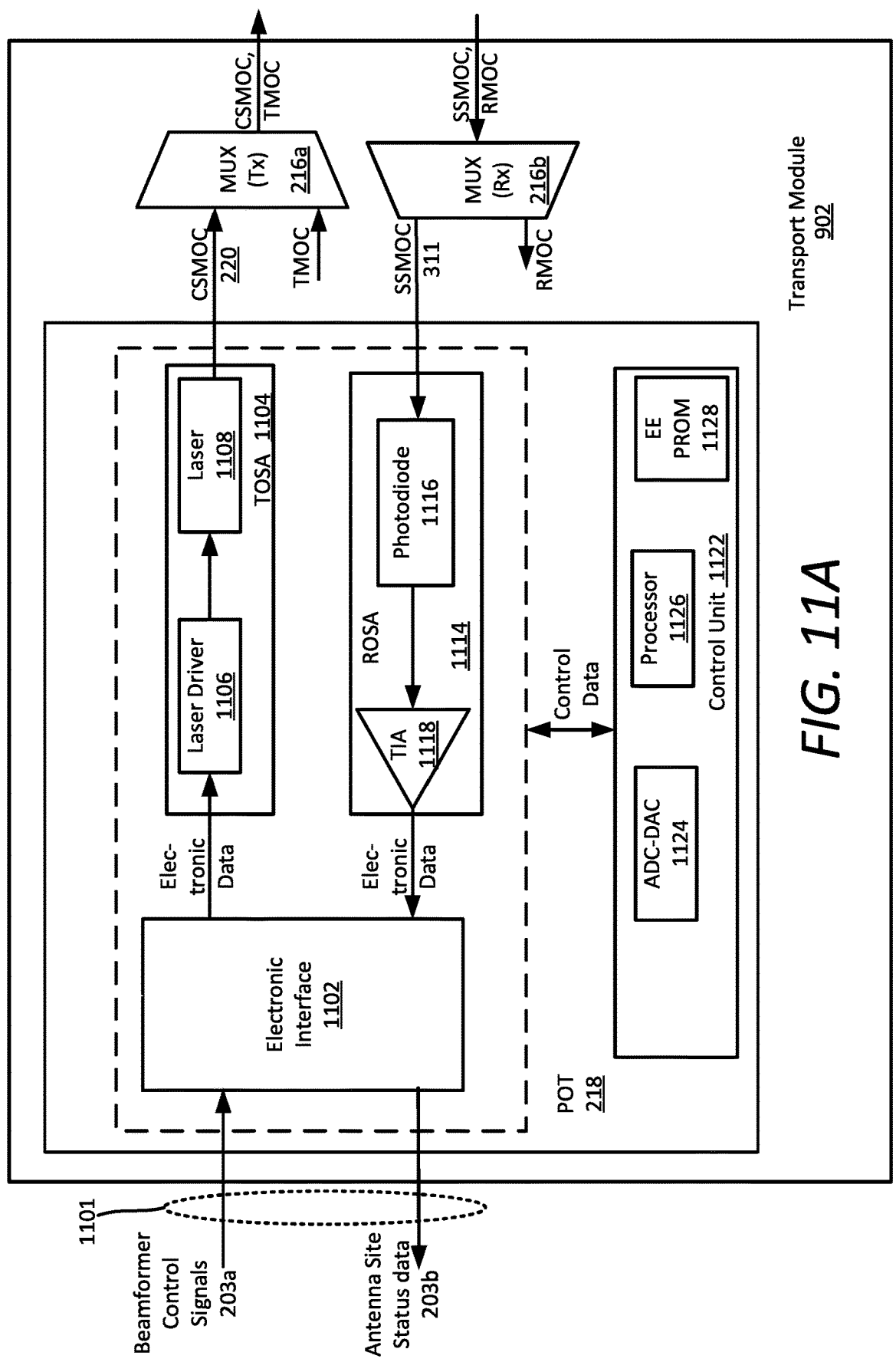
FIGS. 11A and 11B are detailed block diagram of transport modules used to facilitate the FBEE in FIG. 10.

Turning now to FIG. 11A, there is shown a more detailed block diagram of an exemplary transport module 902. As shown in FIG. 11A, a POT 218 can include an electronic interface 1102, a transmit optical sub-assembly (TOSA) 1104, and a receive optical sub-assembly (ROSA) 1114. The electronic interface 1102 is a bidirectional interface configured to conform to a predetermined interface standard 1101 (e.g. SPI, I2C, GPIO) associated with the ACU 202. As such, the electronic interface 1102 can include electronic circuitry to provide the necessary electrical characteristics which are required to facilitate receiving electronic data (i.e., beamforming control signals 203a) in accordance with a particular predetermined interface standard. Similarly, the electronic interface 1102 can include electronic circuitry to provide the necessary electrical characteristics which are required to facilitate transmitting electronic data to the ACU 202 in accordance with a particular predetermined interface standard.

Figure 12:
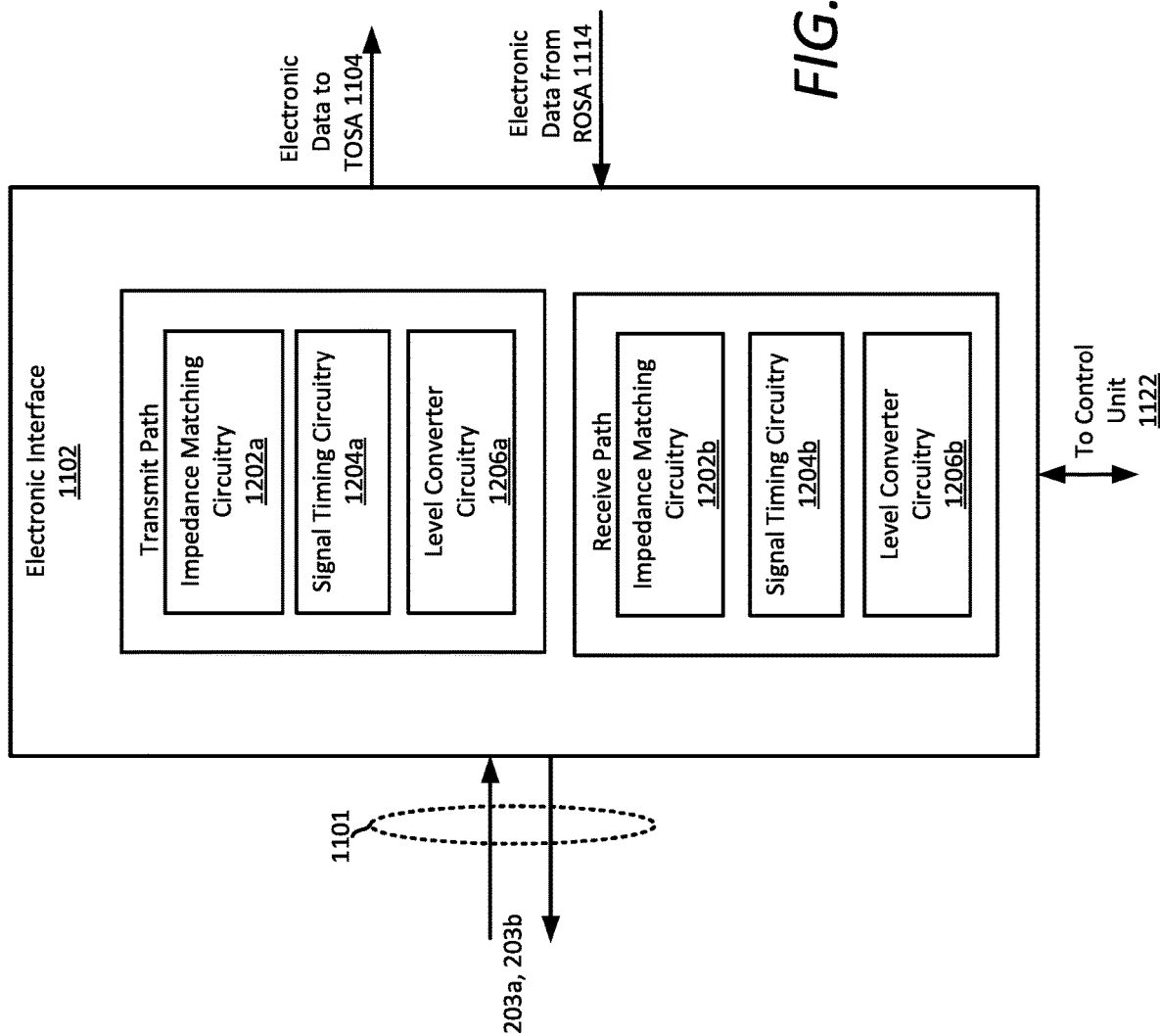
FIG. 12 is detailed block diagram of an electronic interface included in a protocol optical transceiver.

The exact nature of the electronic circuitry necessary to facilitate receiving and transmitting data in accordance with a particular interface standard will naturally depend on the particular interface standard which is being emulated. However, as shown in FIG. 12, the electronic interface 1102 can include one or more of impedance matching networks 1202a, 1202b, timing circuitry 1204a, 1204b, and/or signal level converters 1206a, 1206b to facilitate a bidirectional electronic transceiver capable of conforming to a particular interface standard.

A TOSA is well known construct in the field of optical communications and therefore will not be described here in detail. However, it will be appreciated that a TOSA 1104 is designed to convert electronic data signals into a modulated optical signal which can be coupled to an optical fiber by means of a suitable optical interface. Accordingly, a conventional TOSA 1104 will include laser driver circuitry 1106 which receives transmit data in an electronic format, and a laser source 1108 which is responsive to the laser driver circuitry to produce a modulated optical laser output signal. Other components such as filter elements and isolators (not shown) may also be present within the TOSA 1104.

A ROSA 1114 is also well known construct in the field of optical communications and therefore will not be described here in detail. However, it should be understood that a ROSA 1114 receives an optical signal and converts such signal to an electrical format. As such, the ROSA 1114 can include a photodiode 1116 for converting an optical signal to electronic format, and a transimpedance amplifier (TIA) 1118 for increasing the signal output voltage of the photodiode. Other components may also be present in the ROSA but the foregoing description is sufficient for the purposes of this disclosure.

Within transport module 902, the ROSA, the TOSA and the electronic interface 1102 can operate under the control of a control unit 1122. The control unit can include electronic data storage such as EE PROM 1128. The electronic data storage can contain data and instructions for use by a processor 1126. The processor can be a microprocessor, a microcontroller, an application specific circuit, a programmable logic device, or other circuit programmed to perform the functions described herein. The control unit can also include an analog-to-digital converter (ADC) and a digital-to-analog converter (DAC) (collectively ADC/DAC) 1124 to facilitate monitoring and control operations with respect to the ROSA and TOSA. For example, it is known in the field of optical transceivers that these components can be used to control and/or monitor voltage bias levels applied to certain components, such as the laser and photodiode.

The electronic interface 1102 can receive and transmit electronic data in accordance with a predetermined interface standard. The electronic interface will perform any necessary modifications to the voltage levels, impedance levels, timing and/or format of the received electronic control signal data so that the data is suitable for modulating an optical carrier. The electronic interface 1102 will communicate the resulting modulated electronic data signal to TOSA 1104.

The TOSA will use the electronic data signal from the interface 1102 to modulate an optical carrier. The modulated optical signal is output from the TOSA 1104 to a transmit multiplexer. In FIGS. 2 and 9 a single optical multiplexer 216 is shown to simplify the drawing. In the more detailed view shown in FIG. 11A, it can be observed that the transmit and receive optical multiplexing functions are actually split into two separate devices, namely a transmit MUX 216a and a receive MUX 216b. The transmit multiplexer 216a can couple both the CSMOC output of TOSA 1104 and the TMOC signal onto a single optical fiber associated with optical fiber link 110. These two modulated optical signals from the MUX 216a can then be communicated to remote site 112.

Figure 11B:
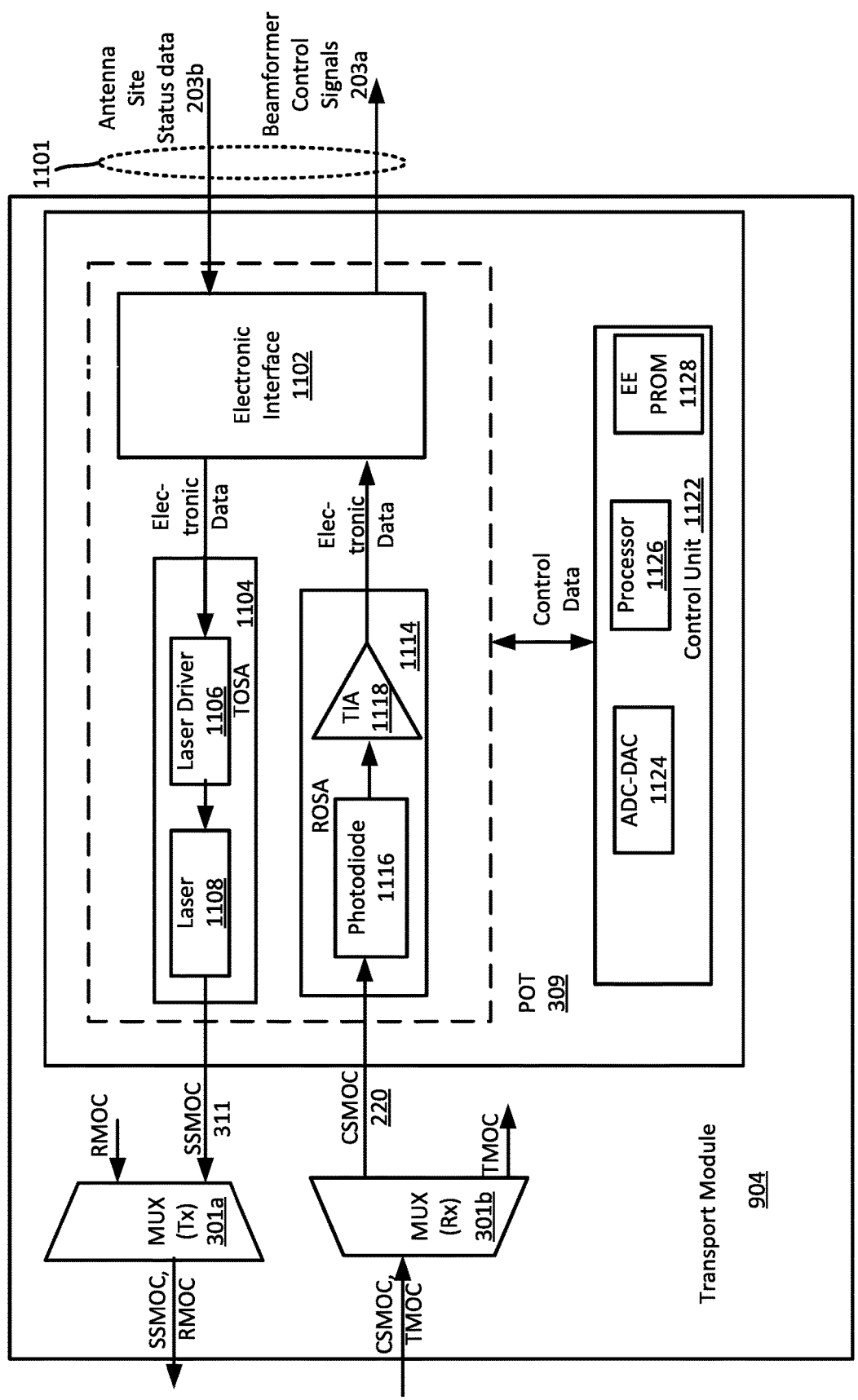

As shown in FIG. 11B, transport module 904 can have a similar configuration which includes MUX 301a, 301b. Accordingly, the description above pertaining to transport module 902 is sufficient for understanding both transport modules 902 and 904. The transport module 904 is configured to communicate SSMOC and RMOC signals to the transport module 902. When these signals are received at the transport module 902 they are coupled from an optical fiber to MUX 216b. The MUX 216b will route each modulated optical signal of a particular wavelength to a different path. For example, the SSMOC can be routed to ROSA 1114 and the RMOC can be routed to the TTDS 108. In the ROSA 1114, the SSMOC will be converted to an electronic data signal by a photodetector (e.g., photodiode 1116). The demodulated electronic data signal can then be communicated to a suitable amplifier, such as transimpedance amplifier (TIA) 1118 to boost its signal level.

The output of the TIA 1118 is coupled to the electronic interface 1102 as shown. The electronic interface 1102 is configured to perform operations on the electronic data received from the ROSA so that the data is conformed to the requirements of the predetermined interface standard (e.g. SPI, I2C, GPIO) used by the ACU 202. As such, the electronic interface 1102 can include electronic circuitry to provide the necessary electrical characteristics which are required to facilitate transmitting electronic data in accordance with a particular predetermined interface standard.

Figure 13:
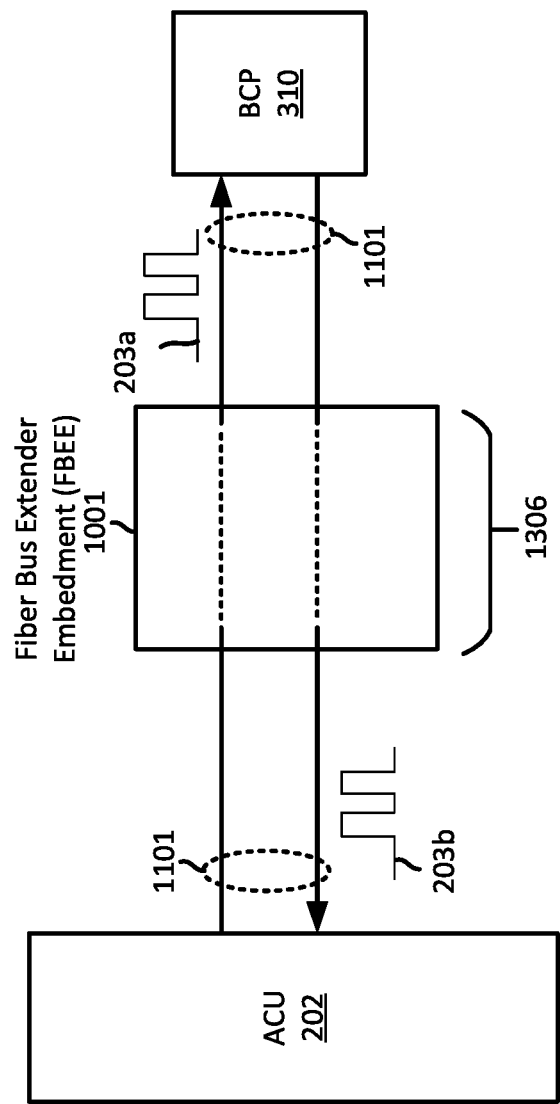
FIG. 13 is conceptual block diagram that is useful for understanding how the presence of an FBEE is transparent to an antenna control unit and a beam control processor communicating.

With the solution described herein, the result shown in FIG. 13 is obtained, whereby a ACU 202 can communicate over large distances with BCP 310. Each of the ACU 202 and the BCP 310 can communicate beamforming data 203a, and status data 203b over an electronic data interface having electrical characteristics conforming to a predetermined electronic interface standard 1101. A usable distance of the electronic data communication link is extended by interposing the FBEE 1101 at an embedment location 1306 along the path of the electronic data communication link. The embedment location is intermediate of the ACU and BCP as shown. The transport modules and optical communication link of the FBEE 201 allow it to appear to each of these ACU 202 and BCP 310 as though they are communicating directly with each other, with minimal latency. However, the two devices can in fact be widely separated and the large distances between them is actually traversed using the optical fiber link.

The FBEE solution for a remote phased array as disclosed herein allows for large distances to separate a central radio hub 102 and remote sites 112, while preserving the type of real time continuous communications (with little or no latency) which are necessary for remote phased array operations. Notably the transport modules 902, 904 and more particularly the POTs 218, 309 provide direct optical connections to commercial off-the-shelf processors and remote devices which are otherwise only configured to communicate by means of a conventional electronic interface standard. Accordingly, cost and complexity are reduced at the central radio hub 102 and at the remote site 112. The approach allows for near real-time beamforming control of the phased array antenna system 118, limited only by the inherent delays determined by the length of the optical fiber and the speed of light down the fiber path. A further advantage of the system disclosed herein is that it facilitates communication of RF signal data (in the form of TMOC and RMOC) with the remote antenna site. Each of the TMOC, RMOC, CSMOC and SSMOC can have a different optical wavelength to facilitate wavelength division multiplexing as described herein. Further, the FBEE can support an ACU 202 and BCP 310 which utilize the same or a different interface standard. Accordingly, a single set of transport modules 902, 904 can facilitate concurrent communications with multiple different devices using a plurality of different interface standards. Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for operating a phased array antenna system from a remote location, comprising:
at a radio hub location,
generating an RF signal;
modulating with the RF signal a continuous wave optical carrier to produce a transmit modulated optical carrier (TMOC);
generating electronic control signal digital data which is configured to selectively control an antenna beam pattern of an array antenna;
responsive to the electronic control signal digital data, modulating an optical carrier to generate a control signal modulated optical carrier (CSMOC) comprising digital data;
coupling both the TMOC and CSMOC to a first optical fiber, whereby the TMOC and CSMOC are communicated to an antenna site which is remote from the radio hub location on a same optical fiber; and
at the antenna site,
processing the CSMOC to recover the electronic control signal digital data;
using the TMOC to produce a plurality of transmit element level modulated RF (ELMRF) signals;
using the electronic control signal data to selectively independently control a phase and an amplitude of each of the transmit ELMRF signals; and
coupling the plurality of transmit ELMRF signals to a plurality of antenna elements of the array antenna.

2. The method according to claim 1, wherein the plurality of transmit ELMRF signals are obtained by splitting the TMOC into a plurality of transmit element level modulated optical carrier (ELMOC) signals, and then demodulating the transmit ELMOC signals.

3. The method according to claim 2, further comprising controlling the phase of each of the transmit ELMRF signals by performing at least one operation on each of the transmit ELMOC signals in the optical domain.

4. The method according to claim 2, further comprising controlling the phase of each of the transmit ELMRF signals by performing at least one operation on each of the transmit ELMRF signals in the RF domain.

5. The method according to claim 1, wherein the TMOC and CSMOC are concurrently coupled to the first optical fiber.

6. A method for operating a phased array antenna system from a remote location, comprising:
 at a radio hub location,
  generating an RF signal;
  modulating with the RF signal a continuous wave optical carrier to produce a transmit modulated optical carrier (TMOC);
  generating electronic control signal digital data which is configured to selectively control an antenna beam pattern of an array antenna;
  responsive to the electronic control signal digital data, modulating an optical carrier to generate a control signal modulated optical carrier (CSMOC) comprising digital data;
  coupling both the TMOC and CSMOC to a first optical fiber, whereby the TMOC and CSMOC are communicated to an antenna site which is remote from the radio hub location on a same optical fiber; and
 at the antenna site,
  processing the CSMOC to recover the electronic control signal digital data;
  using the TMOC to produce a plurality of transmit element level modulated RF (ELMRF) signals;
  using the electronic control signal data to selectively independently control a phase of each of the transmit ELMRF signals;
  using the electronic control signal data which has been recovered at the antenna site to selectively independently control an amplitude of each of the transmit ELMRF signals; and
  coupling the plurality of transmit ELMRF signals to a plurality of antenna elements of the array antenna;
 wherein the plurality of transmit ELMRF signals are obtained by splitting the TMOC into a plurality of transmit element level modulated optical carrier (ELMOC) signals, and then demodulating the transmit ELMOC signals.

7. The method according to claim 6, further comprising controlling the amplitude of each of the transmit ELMRF signals by performing at least one operation in the optical domain to selectively independently modify each of the transmit ELMOC signals.

8. The method according to claim 6, further comprising controlling the amplitude of each of the transmit ELMRF signals by performing at least one operation in the RF domain to selectively independently modify each of the transmit ELMRF signals.

9. A method for operating a phased array antenna system from a remote location, comprising:
 at a radio hub location,
  generating an RF signal;
  modulating with the RF signal a continuous wave optical carrier to produce a transmit modulated optical carrier (TMOC);
  generating electronic control signal digital data which is configured to selectively control an antenna beam pattern of an array antenna;
  responsive to the electronic control signal digital data, modulating an optical carrier to generate a control signal modulated optical carrier (CSMOC) comprising digital data;
  coupling both the TMOC and CSMOC to a first optical fiber, whereby the TMOC and CSMOC are communicated to an antenna site which is remote from the radio hub location on a same optical fiber; and
 at the antenna site,
  processing the CSMOC to recover the electronic control signal digital data;
  using the TMOC to produce a plurality of transmit element level modulated RF (ELMRF) signals;
  using the electronic control signal data to selectively independently control a phase of each of the transmit ELMRF signals;
  coupling the plurality of transmit ELMRF signals to a plurality of antenna elements of the array antenna;
  coupling a plurality of receive ELMRF signals respectively from the plurality of antenna elements comprising the array antenna, to a plurality of optical modulators, so as to respectively generate a plurality of receive element level modulated optical carrier (ELMOC) signals; and
  responsive to the electronic control signal data, performing phase adjustment operations to facilitate receive beam-forming operations with respect to the array antenna.

10. The method according to claim 9, further comprising:
combining the plurality of receive ELMOC signals after the phase adjustment operations have been performed to form a receive modulated optical carrier (RMOC) signal; and
coupling the RMOC to a second optical fiber to communicate the RMOC from the antenna site to the radio hub location.

11. The method according to claim 10, further comprising
generating status digital data concerning a status of at least one condition at the antenna site;
responsive to the status digital data, modulating an optical carrier to generate a status signal modulated optical carrier (SSMOC); and
coupling the SSMOC to the second optical fiber to communicate the SSMOC from the antenna site to the radio hub location.

12. The method according to claim 10, wherein the first optical fiber and the second optical fiber are the same optical fiber.

13. The method according to claim 12, wherein the TMOC, RMOC, CSMOC and SSMOC are communicated concurrently on the same optical fiber.

14. A method for operating a phased array antenna system from a remote location, comprising:
 at a radio hub location,
  generating an RF signal;
  modulating with the RF signal a continuous wave optical carrier to produce a transmit modulated optical carrier (TMOC);
  generating electronic control signal digital data which is configured to selectively control an antenna beam pattern of an array antenna;
  responsive to the electronic control signal digital data, modulating an optical carrier to generate a control signal modulated optical carrier (CSMOC) comprising digital data;
  coupling both the TMOC and CSMOC to a first optical fiber, whereby the TMOC and CSMOC are communicated to an antenna site which is remote from the radio hub location on a same optical fiber; and
 at the antenna site,
  processing the CSMOC to recover the electronic control signal digital data;
  using the TMOC to produce a plurality of transmit element level modulated RF (ELMRF) signals;

using the electronic control signal data to selectively independently control a phase of each of the transmit ELMRF signals; and coupling the plurality of transmit ELMRF signals to a plurality of antenna elements of the array antenna; and emulating direct communication in accordance with a predetermined electronic interface standard (PEIS) between an antenna control unit (ACU) at the radio hub which generates the electronic control signal data, and a beam control processor (BCP), which uses the electronic control signal data at the antenna site, by using a first and second transport module, respectively disposed proximate to the radio hub location and the antenna site, to communicate the CSMOC through the first optical fiber.

15. The method according to claim 14, further comprising using the first transport module to emulate the presence of the BCP at the radio hub by masking the presence of the optical fiber link between the ACU and BCP, and communicating directly with the ACU in accordance with the PEIS.

16. The method according to claim 14, further comprising using the second transport module to emulate the presence of the ACU at the antenna site by communicating with the BCP in accordance with the PEIS, while masking the presence of the optical fiber link.

17. A method for operating a phased array antenna system from a remote location, comprising:

at a radio hub location,
    generating electronic control signal digital data which is configured to selectively control an antenna beam pattern of an array antenna;
    responsive to the electronic control signal digital data, modulating an optical carrier to generate a control signal modulated optical carrier (CSMOC) comprising digital data;
    coupling the CSMOC to a first optical fiber to communicate the CSMOC to an antenna site which is remote from the radio hub location; and at the antenna site,
    processing the CSMOC to recover the electronic control signal data;
    coupling a plurality of receive element level modulated RF (ELMRF) signals respectively from a plurality of antenna elements comprising the array antenna, to a plurality of optical modulators, so as to respectively generate a plurality of receive element level modulated optical carrier (ELMOC) signals;
    responsive to the electronic control signal data, performing phase adjustment operations and amplitude adjustment operations to facilitate receive beamforming operations with respect to the array antenna;
    combining the plurality of receive ELMOC signals after the phase adjustment operations have been performed to form a receive modulated optical carrier (RMOC) signal; and
    coupling the RMOC to a second optical fiber to communicate the RMOC from the antenna site to the radio hub location.

18. The method according to claim 17, wherein the first and second optical fiber are the same optical fiber.

19. The method according to claim 17, wherein the phase adjustment operations are performed in the optical domain by independently selectively modifying each of the plurality of receive ELMOC signals.

20. The method according to claim 17, wherein the phase adjustment operations are performed in the RF domain by independently selectively modifying each of the plurality of receive ELMRF signals.

21. The method according to claim 17, wherein the CSMOC and RMOC are concurrently coupled respectively to the first and second optical fiber.

22. The method according to claim 17, further comprising performing the amplitude adjustment operations in the optical domain by independently selectively modifying each of the receive ELMOC signals.

23. The method according to claim 17, further comprising performing the amplitude adjustment operations in the RF domain by independently selectively modifying each of the receive ELMRF signals.

24. A communication system, comprising:

a central radio hub comprising an antenna control unit and at least one radio hub photonic subsystem (RHPS), the RHPS including at least one opto-electronic and electro-optic (O/E-E/O) conversion interface;

the antenna control unit configured to generate electronic control signal digital data which is configured to selectively control an antenna beam pattern of an array antenna;

the RHPS configured to
    modulate an optical carrier signal responsive the electronic control signal digital data so as to form a control signal modulated optical carrier (CSMOC);
    utilize a radio frequency (RF) signal to modulate a continuous wave optical carrier to produce a transmit modulated optical carrier (TMOC); and
    an optical multiplexer configured to concurrently couple the TMOC and the CSMOC to a first optical fiber for communication to an antenna site which is remote from the central radio hub, whereby the TMOC and CSMOC are communicated on a same optical fiber;

the antenna site comprising an antenna site photonic subsystem (ASPS) that is configured to:
    generate a status digital data concerning a status of at least one condition;
    modulate an optical carrier responsive to the status digital data to generate a status signal modulated optical carrier (SSMOC); and
    couple the SSMOC to a second optical fiber to communicate the SSMOC from the antenna site to the RHPS.

25. The communication system according to claim 24, wherein the ASPS is configured to
    process the CSMOC to recover the electronic control signal digital data;
    split the TMOC into a plurality of transmit element level modulated optical carrier (ELMOC) signals; and
    use the transmit ELMOC signals to produce a plurality of transmit element level modulated RF (ELMRF) signals.

26. The communication system according to claim 24, wherein the ASPS is configured to use the electronic control signal data to selectively independently control a phase of each of the transmit ELMRF signals.

27. The communication system according to claim 26, further comprising a plurality of antenna elements which comprise the array antenna, the plurality of antenna elements configured to accept the transmit ELMRF signals from the ASPS to form a transmit antenna beam.

28. The communication system according to claim 27, wherein the ASPS includes a plurality of optical waveguides configured to distribute the plurality of transmit ELMOC signals to a plurality of conversion locations, each associated with a respective demodulator for extracting the transmit ELMRF signal, each of the conversion locations proximate to one of a plurality of antenna elements.

29. The communication system according to claim 27, wherein the plurality of antenna elements are configured to generate a plurality of receive element level modulated RF (ELMRF) signals in a receiving operation, and the ASPS includes a plurality of optical modulators respectively coupled to the plurality of antenna elements, the plurality of optical modulators configured to respectively generate a plurality of receive element level modulated optical carrier (ELMOC) signals responsive to the receive ELMRF signals.

30. The communication system according to claim 29, wherein the ASPS is responsive to the electronic control signal data to perform phase adjustment operations to facilitate receive beam-forming operations with respect to the array antenna.

31. The communication system according to claim 29, wherein the ASPS is configured to combine the plurality of receive ELMOC signals to form a receive modulated optical carrier (RMOC) signal.

32. The communication system according to claim 31, wherein the ASPS is further comprised of an optical coupler configured to couple the RMOC to a second optical fiber, the second optical fiber configured to facilitate communication of the RMOC to the RHPS.

33. The communication system according to claim 24, wherein the first optical fiber and the second optical fiber are the same optical fiber.

* * * * *